(12) United States Patent
Nishimura

(10) Patent No.: US 12,335,566 B2
(45) Date of Patent: Jun. 17, 2025

(54) SYSTEMS AND METHODS FOR PROVIDING MEDIA RECOMMENDATIONS

(71) Applicant: Adeia Guides Inc., San Jose, CA (US)

(72) Inventor: Akitaka Nishimura, Tokyo (JP)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/386,753

(22) Filed: Nov. 3, 2023

(65) Prior Publication Data

US 2024/0080520 A1 Mar. 7, 2024

Related U.S. Application Data

(63) Continuation of application No. 17/094,988, filed on Nov. 11, 2020, now Pat. No. 11,849,177.

(51) Int. Cl.
| | |
|---|---|
| *H04N 21/442* | (2011.01) |
| *H04N 21/4223* | (2011.01) |
| *H04N 21/466* | (2011.01) |
| *G06V 40/16* | (2022.01) |

(52) U.S. Cl.
CPC ... *H04N 21/44218* (2013.01); *H04N 21/4223* (2013.01); *H04N 21/4667* (2013.01); *G06V 40/174* (2022.01)

(58) Field of Classification Search
CPC ........ H04N 21/44218; H04N 21/4667; H04N 21/4223; H04N 21/4668; H04N 21/42201; H04N 21/4826; H04N 21/4756; H04N 21/4532; H04N 21/25891; H04N 21/252; H04N 21/4661; G06K 9/00302; G06V 40/174

USPC .......................................................... 725/12
See application file for complete search history.

(56) References Cited

U.S. PATENT DOCUMENTS

| | | |
|---|---|---|
| 5,483,278 A | 1/1996 | Strubbe et al. |
| 7,185,355 B1 | 2/2007 | Ellis et al. |
| 7,761,892 B2 | 7/2010 | Ellis et al. |
| 8,640,021 B2 | 1/2014 | Perez et al. |
| 9,503,786 B2 | 11/2016 | El Kaliouby et al. |
| 9,520,957 B2 | 12/2016 | Ramirez Flores et al. |
| 10,491,940 B1 | 11/2019 | Sinnott et al. |

(Continued)

FOREIGN PATENT DOCUMENTS

| | | |
|---|---|---|
| JP | 2019050603 A | 3/2019 |
| WO | 0243391 A1 | 5/2002 |

OTHER PUBLICATIONS

U.S. Appl. No. 18/140,947, filed Apr. 28, 2023, Akitaka Nishimura.

(Continued)

*Primary Examiner* — Cynthia M Fogg
(74) *Attorney, Agent, or Firm* — Haley Guiliano LLP

(57) ABSTRACT

Systems and methods are described for performing an action related to an identifier for a recommended media asset presented to a user, based on a detected emotional indicator of the user. The identifier for the initial recommended media asset is generated for presentation to the user, and one or more images of the user are captured while generating for presentation the identifier for the initial recommended media asset to the user. An emotional indicator of the user is detected based on the one or more captured images, and an action related to the identifier for the initial recommended media asset is performed based on the detected emotional indicator.

20 Claims, 11 Drawing Sheets

(56) References Cited

U.S. PATENT DOCUMENTS

| | | |
|---|---|---|
| 10,631,029 B1 | 4/2020 | Nijim et al. |
| 10,657,718 B1 | 5/2020 | Miranda et al. |
| 11,373,446 B1 | 6/2022 | Beisel et al. |
| 11,375,256 B1 | 6/2022 | Dorner |
| 11,641,506 B2 | 5/2023 | Nishimura |
| 11,849,177 B2 | 12/2023 | Nishimura |
| 2002/0174428 A1 | 11/2002 | Agnihotri et al. |
| 2004/0003392 A1 | 1/2004 | Trajkovic et al. |
| 2006/0020973 A1 | 1/2006 | Hannum et al. |
| 2006/0156220 A1 | 7/2006 | Dreystadt et al. |
| 2009/0138805 A1 | 5/2009 | Hildreth |
| 2009/0307726 A1 | 12/2009 | Levin et al. |
| 2010/0011388 A1 | 1/2010 | Bull et al. |
| 2010/0306671 A1 | 12/2010 | Mattingly et al. |
| 2011/0134026 A1 | 6/2011 | Kang et al. |
| 2012/0066059 A1 | 3/2012 | Berger |
| 2012/0090005 A1 | 4/2012 | Marlow et al. |
| 2012/0117488 A1 | 5/2012 | Amidon et al. |
| 2012/0124456 A1 | 5/2012 | Perez et al. |
| 2012/0222058 A1 | 8/2012 | El et al. |
| 2014/0215504 A1 | 7/2014 | Hsiao et al. |
| 2014/0380359 A1* | 12/2014 | Musil ................ H04N 21/6582 725/34 |
| 2015/0067708 A1 | 3/2015 | Jensen et al. |
| 2015/0347416 A1 | 12/2015 | Lin et al. |
| 2015/0350730 A1 | 12/2015 | El Kaliouby et al. |
| 2016/0234152 A1* | 8/2016 | Allen .................... H04L 51/216 |
| 2016/0255170 A1 | 9/2016 | Gargi et al. |
| 2016/0337696 A1* | 11/2016 | Lee ........................ G06Q 30/02 |
| 2019/0166070 A1 | 5/2019 | Dey et al. |
| 2019/0174190 A1 | 6/2019 | Newell et al. |
| 2019/0266185 A1* | 8/2019 | Rao .................... H04N 21/4758 |
| 2020/0183773 A1 | 6/2020 | Brehm |
| 2020/0221181 A1 | 7/2020 | Gupta et al. |
| 2020/0273485 A1* | 8/2020 | Jagmag ................. G06N 3/047 |
| 2020/0387934 A1* | 12/2020 | M V ................... G06Q 30/0271 |
| 2021/0174590 A1 | 6/2021 | Huet et al. |
| 2021/0262291 A1 | 8/2021 | Slaughter et al. |
| 2022/0132221 A1* | 4/2022 | Shimy ............. H04N 21/44218 |
| 2022/0150582 A1 | 5/2022 | Nishimura |
| 2022/0150592 A1 | 5/2022 | Nishimura |

OTHER PUBLICATIONS

Lin et al., "Design and implementation of face recognition-aided IPTV adaptive group recommendation system based on NLMS algorithm," 2012 Int'l Symposium on Communications and Information Technologies (ISCIT), 2012.

PCT International Search Report and Written Opinion for International Application No. PCT/US2020/066443, dated Jun. 25, 2021 (17 pages).

Shepstone et al., "Using Audio-Derived Affective Offset to Enhance TV Recommendation," in IEEE Transactions on Multimedia, 16(7): 1999-2010 (2014).

* cited by examiner

SYSTEMS AND METHODS FOR PROVIDING MEDIA RECOMMENDATIONS

CROSS-REFERENCE TO RELATED APPLICATION

This application is a continuation of U.S. patent application Ser. No. 17/094,988, filed Nov. 11, 2020, the disclosures of which are hereby incorporated by reference herein in their entireties.

BACKGROUND

This disclosure relates to recommending media assets to a user, and more particularly, to systems and methods for identifying users by facial recognition and presenting media content recommendations to the users, and systems and methods for performing an action related to an identifier of recommended media content presented to a user, based on a detected emotional indicator of the user.

SUMMARY

Modern media distribution systems enable a user to access more media content than ever before. However, given the large variety of media providers and media assets available to a user, it may a challenging task for users of media services (e.g., cable, broadcast, satellite, over-the-top provider) to efficiently locate content he or she is interested in.

In one approach, recommended content may be provided to a user based on other content the user has consumed. However, many viewers prefer consuming content with friends and family, and recommended content based on viewing habits of only one of the users may not be useful in finding content that would be enjoyable to multiple users with different interests. In another approach, a user may be permitted to scroll through various recommended content items in order to locate a content item he or she is interested in. However, such approach merely enables a user to passively navigate a static set of recommended content items, without taking into account whether the user, in real time, is interested in any of the content items. This may frustrate the user, such that the user may decide not to consume media at all. In such instance, the next time the user attempts to consume content he or she may merely be provided with the same recommendations that did not interest him or her (e.g., since his or her viewing history is unchanged).

In some embodiments, to overcome one or more of these problems, systems and methods are provided herein for presenting a graphical user interface (GUI) including identifiers for media assets recommended for each of multiple users detected to be in the vicinity of the user equipment. A content recommendation application identifies, using facial recognition, a plurality of users (including a first user and a second user) in a vicinity of user equipment, and determines a first recommended media asset for the first user and a second recommended media asset based on respective user profiles of the first and second user. The content recommendation application generates for presentation the GUI including a first identifier selectable to access the first recommended media asset and a second identifier selectable to access the second recommended media asset, and in response to receiving selection of the first identifier or the second identifier, generates for presentation the recommended media asset associated with the selected identifier. Such aspects allow simultaneous presentation of recommended media assets for each user that is interested in consuming media, to facilitate selection of content each user can enjoy. In addition, even if one of the users (e.g., the second user) has never used a device (e.g., a television at the first user's home) on which content is to be consumed, recommended content for such user can conveniently be presented without requiring any effort on the part of the user.

In some embodiments, to overcome one or more of the above problems, systems and methods are also provided herein for performing an action related to an identifier for a recommended media asset based on a detected emotional indicator of a user. A content recommendation application may generate for presentation to a user an identifier for an initial recommended media asset, and capture one or more images of the user while generating for presentation the identifier for the initial recommended media asset to the user. The content recommendation application may detect an emotional indicator of the user based on the one or more captured images, and perform, based on the detected emotional indicator, an action related to the identifier for the initial recommended media asset. Such aspects enable a suitable action (e.g., presenting an identifier for an updated recommended media asset, selecting the identifier for a media asset, presenting a preview of the recommended media asset, refraining from updating the media asset, etc.) to be dynamically performed based on an emotion being exhibited by the user (e.g., while reviewing one or more identifiers for recommended media assets).

In some embodiments, the content recommendation application may determine a third recommended media asset for the first user and the second user based on the user profile of the first user and the user profile of the second user. A third identifier selectable to access the third recommended media asset may be generated for presentation, and the third recommended media asset may be generated for presentation in response to receiving selection of the third identifier.

In some aspects of this disclosure, the GUI may further include a first category identifier associated with a first plurality of recommended media assets determined based on the user profile of the first user, where the first plurality of recommended media assets includes the first recommended media asset. The GUI may further include a second category identifier associated with a second plurality of recommended media assets determined based on the user profile of the second user, where the second plurality of recommended media assets may include the second recommended media asset. In some embodiments, the GUI may further include a third category identifier associated with a third plurality of recommended media assets (including the third recommended media asset) determined based on the user profile of the first user and the user profile of the second user.

In some embodiments, at least one recommended media asset included in the third plurality of recommended media assets may not be included in the first plurality of recommended media assets and the second plurality of recommended media assets. User profiles of each user may include a viewing history of the user, and the user profiles may be updated based on selection of the third identifier.

The GUI may further include a first view associated with the first user in which the first identifier is presented more prominently than the second identifier and the third identifier, a second view associated with the second user in which the second identifier is presented more prominently than the first identifier and the third identifier, and a third view in which the third identifier is presented more prominently than the first identifier and the second identifier. The content recommendation application may generate for presentation a selectable option to navigate from the first view to the second view (and/or from the first view to the third view, and/or the second view to the third view, and/or vice versa).

In some embodiments, the content recommendation application may detect whether the second user remains within the vicinity of the user equipment, and the content recommendation application may, in response to determining that the second user has not been within the vicinity of the user equipment for a predefined period of time, cease the generating for presentation of the identifier of the second recommended media asset (and/or the third recommended media asset).

In some aspects of this disclosure, the content recommendation application may determine that the detected emotional indicator indicates the user is not interested in the initial recommended media asset, and the action to be performed based on the detected indicator may comprise generating for presentation an identifier for an updated recommended media asset. The updated recommended media asset associated with the identifier may be determined based on a retrieved user profile and the detected emotional indicator.

In some embodiments, the content recommendation application may determine the detected emotional indicator indicates the user is interested in the initial recommended media asset, and the action may comprise selecting the identifier for the initial recommended media asset.

Detecting the emotional indicator of the user may comprise identifying at least one of a facial expression of the user or body language of the user. The content recommendation application may detect an initial emotional indicator of the user prior to generating for presentation the identifier for the initial recommended media asset, where the identifier for the initial recommended media asset is generated for presentation based on the initial emotional indicator of the user.

In some embodiments, the content recommendation application may generate for presentation a plurality of identifiers for respective initial recommended media assets, where the plurality of identifiers for the respective initial recommended media assets includes the identifier for the initial recommended media asset. The emotional indicator of the user may be detected while receiving a command from the user to scroll through the identifiers of the plurality of initial recommended media assets.

In some embodiments, the content recommendation application may store in memory a table of facial characteristics and corresponding emotional indicators, and detecting the emotional indicator based on the one or more captured images may comprise identifying facial characteristics of a face of the user in the one or more captured images; comparing the identified facial characteristics to the stored facial characteristics; determining, based on the comparison, whether the identified facial characteristics match the stored facial characteristics; and in response to determining the identified facial characteristics match the stored facial characteristics, determining the emotional indicator of the user is the emotional indicator that corresponds to the matched facial characteristic.

The content recommendation application may identify a plurality of users in a vicinity of user equipment, where the user is included in the plurality of users, and at least one of the plurality of users is detected by facial recognition; capture one or more images of the plurality of users while generating for presentation the identifier for the initial recommended media asset to the users; detect, based on the captured images, respective emotional indicators of the plurality of users while generating for presentation the identifier for the initial recommended media asset to the users; and determine an aggregate emotional indicator of the plurality of users; wherein the action to be performed is determined based on the aggregate emotional indicator of the plurality of users. In some embodiments, detecting respective emotional indicators of the plurality of users comprises identifying at least one of the facial expressions of the users or body language of the users.

BRIEF DESCRIPTION OF THE DRAWINGS

The above and other objects and advantages of the present disclosure will be apparent upon consideration of the following detailed description, taken in conjunction with the accompanying drawings, in which like reference characters refer to like parts throughout, and in which.

DETAILED DESCRIPTION

Figure 1:
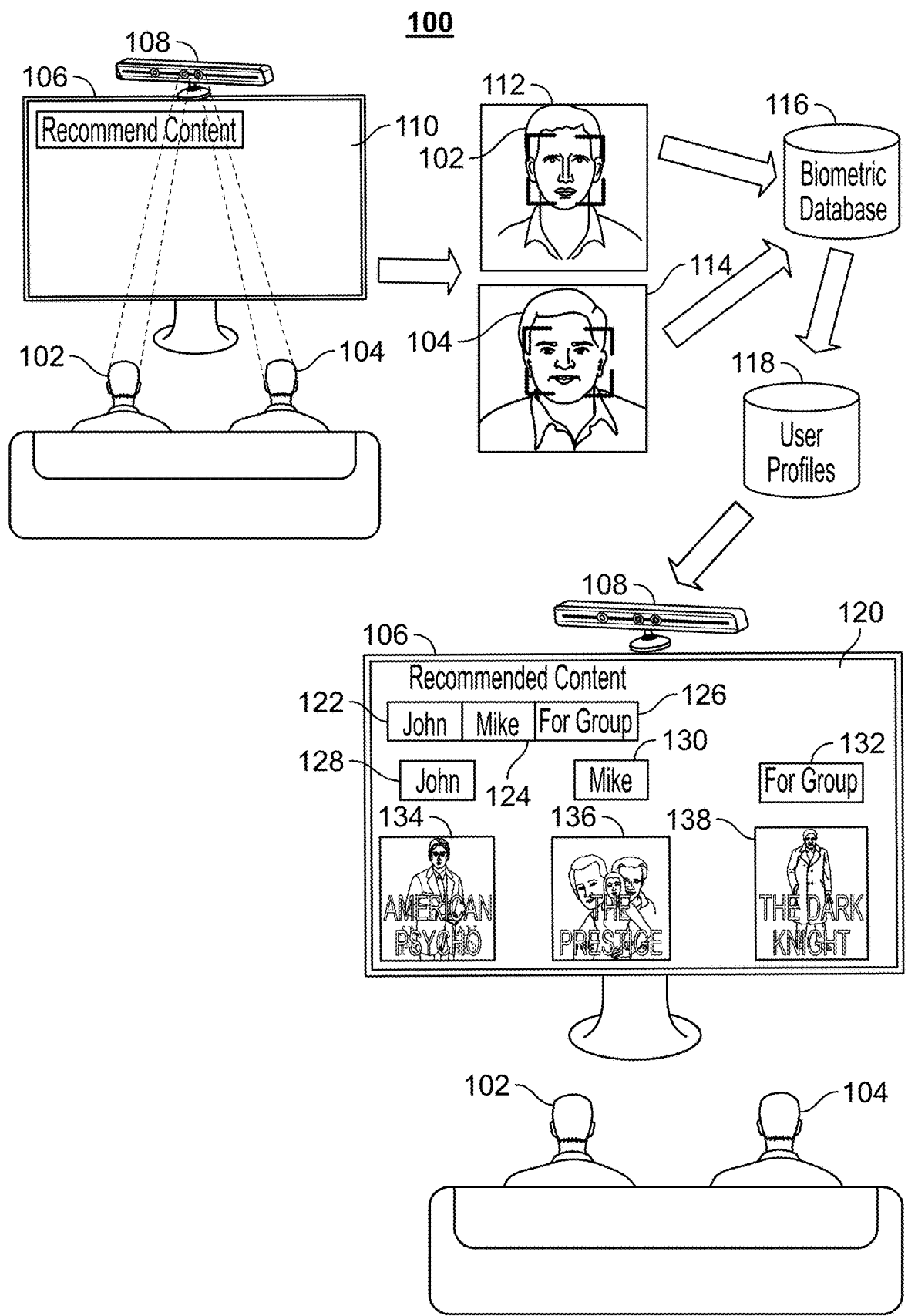
FIG. 1 shows an example of generating identifiers for recommended media assets for multiple users detected to be in a vicinity of user equipment, in accordance with some embodiments of this disclosure.

FIG. 1 shows an example of system 100 generating identifiers for recommended media assets for multiple users detected to be in a vicinity of user equipment, in accordance with some embodiments of this disclosure. System 100 may include user equipment 106 (e.g., a television, mobile device, phone, tablet, computer, or any other computing device) and sensor 108 (e.g., a camera) communicatively coupled to (or included as part of) user equipment 106. User equipment 106 may include a graphical user interface (GUI), which may include one or more GUIs 110, 120, enabling users to interact with a content recommendation application. User equipment 106, sensor 108, biometric database 116, and user profile database 118 may be communicatively coupled via a network (e.g., network 308 of FIG. 3, network 458 of FIG. 4). As referred to herein, the term "media asset" should be understood to mean an electronically consumable user asset, such as television programming, as well as pay-per-view programs, on-demand programs (as in video-on-demand (VOD) systems), Internet content (e.g., streaming content, downloadable content, webcasts, etc.), videos, video clips, audio, playlists, websites, articles, electronic books, blogs, social media, applications, games, and/or any other media or multimedia, and/or combination of the same. In some embodiments, biometric database 116 and user profile database 118 may be included in any of server 302, media content source 304, and/or media guidance data source 306 of FIG. 3.

Users 102 and 104 may be viewing recommended content GUI 110 provided by the content recommendation application, and sensor 108 may capture in real time one or more images of users 102 and 104. The content recommendation application may analyze image 112 of a face of user 102 and image 114 of a face of user 104, in order to identify facial characteristics of users 102 and 104. For example, the content recommendation application may utilize any suitable facial recognition algorithm and/or image processing techniques to identify or extract various features (e.g., distance between eyes, distance from chin to forehead, shape of jawline, depth of eye sockets, height of check bones, overall arrangement of facial features, size and shape of facial features, etc.) of the face of user 102 in image 112 and the face of user 104 in image 114.

The content recommendation application may compare the identified facial features of user 102 to facial feature information of users stored in biometric database 116, and may compare the identified facial features of user 104 to one or more tables of facial feature information corresponding to users stored in biometric database 116. Based on such comparisons, the content recommendation application may determine whether there is a match between identified facial features of users 102, 104 and facial features of users stored in the biometric database. In some embodiments, the content recommendation application may compute a similarity score for each comparison, and may determine that there is a match if a computed similarity score exceeds a certain threshold.

In some embodiments, the content recommendation application may generate an image signature or facial signature of user 102 and user 104. For example, the facial signature may comprise a feature vector including numerical values representing the various detected facial features (e.g., a numerical value representing a distance between eyes, a numerical value representing a shape of jawline, etc.) and such feature vector may be compared to feature vectors associated with known faces of users in biometric database 116.

The content recommendation application may determine based on the above comparison that the identified facial features of image 112 match biometric data for user 102, and that the identified facial features of image 114 match biometric data for user 104. In response to such determinations, the content recommendation application may retrieve user profiles for each of user 102 and 104 from user profile database 118. The user profiles may indicate, e.g., various interests of the user, viewing history of the user, prior search queries of the user, prior interactions with media assets by the user, social media interactions by the user related to media assets, etc. Although user profile database 118 and biometric database 116 are depicted as separate databases, it should be appreciated that user profile database 118 and biometric database 116 may be a single database.

GUI 120 may be generated for presentation to users 102 and 104, including identifiers for media assets 134, 136, and 138, recommended based on the retrieved user profiles of users 102, 104. GUI 120 may include identifier 128 indicating a category of one or more media assets recommended for user 102 ("John"), identifier 130 indicating a category of one or more media assets recommended for user 104 ("Mike"), and identifier 132 indicating a category of one or more media assets recommended for both user 102 and user 104 (e.g., a blended recommendation tailored to appeal to each of user 102 and user 104 by taking into consideration viewing history and/or interests of each of user 102 and user 104). Although FIG. 1 shows a single media asset identifier for each category being generated for presentation by the content recommendation application to avoid overcomplicating the drawing, it should be appreciated that any number of identifiers for media assets may be generated for presentation for each category. The identifiers for the recommended media assets, and the media assets, may be retrieved from, e.g., server 302, media content source 304, and/or media guidance data source 306 of FIG. 3.

GUI 120 may provide identifiers 134, 136 of media assets recommended to users 102, 104, respectively, enabling each user to simultaneously be provided with a recommended media asset. For example, even if users 102 and 104 are accessing the content recommendation application under a profile associated with only user 102, recommendations tailored to user 104 may additionally be provided without requiring any effort form user 104 (e.g., since user 104 may be identified based on facial recognition, which may be used to log in to a profile associated with user 104). In some embodiments, if a user is already accessing his or her profile when a new user is detected by sensor 108, the content recommendation application may update GUI 120 to additionally include an identifier for recommended media assets for the new user. Alternatively, none of the users may be accessing his or her profile prior to the content recommendation application initiating the process shown in system 100.

In some embodiments, options 122, 124, 126 may be selectable by a user to alter presentation of GUI 120. For example, if the content recommendation application receives user selection of option 124 (associated with user 104, "Mike"), GUI 120 may be updated such that the identifier for recommended media asset 136 may be moved to a more prominent position (e.g., switched with the identifier for recommended media asset 134, presented as larger relative to the other identifiers, etc.). Similarly, option 126 may be selected to cause GUI 120 to more prominently present the identifier for recommended media asset 138 relative to the other identifiers.

Media assets in category identifier 132 may be recommended by the content recommendation application based on a comparison of media assets 134 and 136, and/or based on information in the retrieved user profiles of users 102 and 104 identified via facial recognition and image processing techniques. For example, the content recommendation application may recommend media asset 138 at least in part due to media asset 138 sharing features with media asset 134

(e.g., each starring the actor Christian Bale) recommended to user 102 and media asset 136 (e.g., each directed by Christopher Nolan) recommended to user 104. The content recommendation application may determine that media asset 138 is a "compromise" recommendation, e.g., while user 104 ("Mike") may not be interested in horror movies like media asset 134 ("American Psycho") recommended to user 102, user 104 still enjoys thrillers (e.g., such as media asset 138, "The Dark Knight"), and while user 102 ("John") prefers horror movies, he also enjoys the actor Christian Bale (cast in both media asset 134 and media asset 138). The content recommendation application may generate for presentation a media asset (e.g., from among media assets 134, 136, 138) selected by users 102, 104.

In some embodiments, at least one media asset may be recommended under category identifier 132 that may not otherwise be recommended to user 102 or user 104 under categories 128 and 130, respectively. Additionally or alternatively, a media asset recommended to one of user 102 and 104 may be determined to be suitable as a group recommendation, and/or a media asset recommended to each of user 102 and 104 may be generated for presentation as a group recommendation in category 132. Upon receiving selection of content included in category 132, the content recommendation application may update the user profiles of at least one of users 102 and 104 based on the selection. Alternatively, the content recommendation application may refrain from updating the profiles of the users when content is selected from category 132.

In some embodiments, if the content recommendation application does not detect a user (e.g., user 104) for a predefined period of time (e.g., 5 minutes), the content recommendation application may cease generating for presentation an identifier associated with media asset 136 for such user, and optionally remove category 130 from GUI 120. The content recommendation application may additionally or alternatively remove category 132 in response to failing to detect user 104 after a predefined period of time.

Although sensor 108 is depicted in the example of FIG. 1 as a camera, in some aspects of this disclosure, additional or alternative types of sensors may be employed in connection with the content recommendation application. For example, the content recommendation application may identify a voice of a known user by comparing sampled audio (e.g., detected via a microphone) to an audio signature stored for the user in a database, in order to retrieve recommended content for such user. In some embodiments, any combination of biometric devices may be used (e.g., to detect a fingerprint of a user, gaze of a user, etc.) in order to identify a user.

In some embodiments, GUI 120 may be configured to provide a tab option, which enables a user to switch between recommended content for user 102, recommended content for user 104, and recommended content for the group. For example, a first screen may show only content recommended for user 102, and a user may select an option (e.g., option 124) to navigate from the first screen to a second screen, which may show only content recommended for user 104, or an option (e.g., option 126) to navigate to a third screen, which may only show content recommended collectively for the group.

Figure 2A:
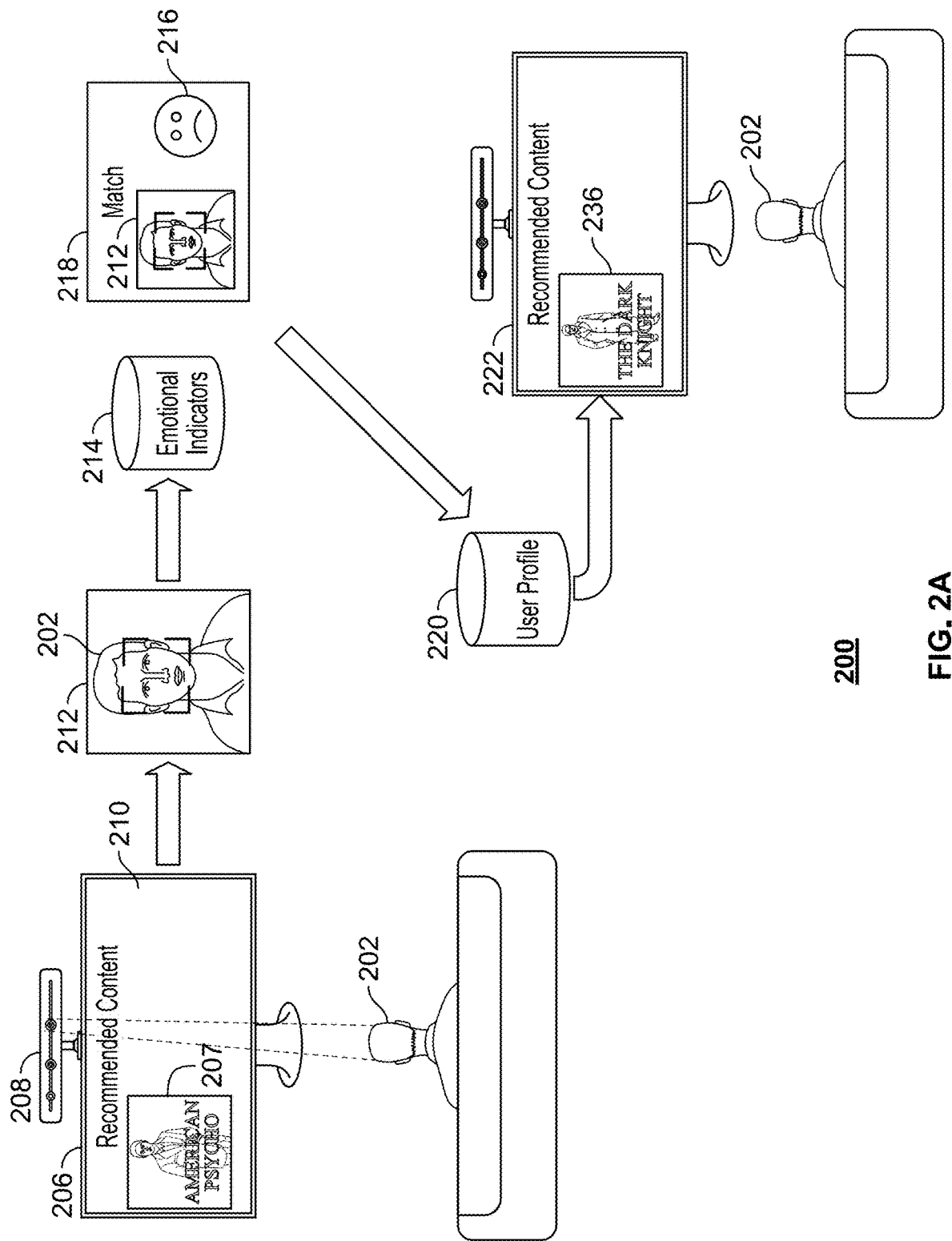
FIG. 2A shows an example of performing, based on a detected emotional indicator, an action related to an identifier for a recommended media asset, in accordance with some embodiments of this disclosure.

FIG. 2A shows an example of system 200 performing, based on a detected emotional indicator, an action related to an identifier for a recommended media asset, in accordance with some embodiments of this disclosure. User 202 may be viewing GUI 210 generated for presentation on user equipment 206 to provide user 202 with initial recommended media asset 207. In some embodiments, recommended media asset 207 may be provided based on a user profile of user 202 (e.g., retrieved using the techniques discussed in FIG. 1), and/or based on a detected emotional indicator of a user. The user may have provided other input (e.g., entered log-in via a button, a remote control, text or voice) to access his or her content recommendation application profile.

While user 202 is viewing GUI 210, sensor 208 (e.g., a camera) may capture in real time, and analyze, one or more images 212 of user 202, and/or capture in real time and analyze other biometric feedback received from the user (e.g., analyze audio of the user detected by a microphone, or any other biometric response or combination thereof). The content recommendation application may analyze the one or more images 212 to identify or extract information regarding various features in the face of user 202 (e.g., facial expressions, gaze patterns, body language, position of eyes, mouth, nose, etc.). The identified or extracted features may be compared to one or more tables of facial features and corresponding emotional indicators stored in emotional indicators database 214 to determine which emotional indicator the identified or extracted features in the one or more images 212 of user 202 correspond to. In some embodiments, the content recommendation application may determine a match if comparison results indicate at least a partial match above a certain threshold (e.g., 50%). In some embodiments, a feature vector may be computed for the identified or extracted features in the one or more images 212 of user 202, and compared to feature vectors of facial characteristics corresponding to respective emotional states (e.g., happy, interested, neutral, sad, disinterested, surprised) stored in emotional indicator database 214.

In some embodiments, the content recommendation application may compute a confidence level (e.g., 80% chance the user is laughing or smiling, 75% chance the user is angry) based on the detected facial features or characteristics, which may be used in the detecting of an appropriate emotional indicator (e.g., interested, neutral, not interested) with respect to presented identifiers of recommended media asset 207. In some embodiments, movement patterns by the user may be captured (e.g., including facial expressions, body language, hand gestures) in determining an emotional state of the user. For example, analysis of captured image 212 of the user may indicate the user is shaking his or her head no, indicating he or she is not interested in the initial media asset recommendation 207.

If the content recommendation application determines there is match 218 between the facial features identified or extracted from image 212 of the user and features associated with an emotional indicator 216 (e.g., an emotion of "sad"), the content recommendation application may determine that user 202 is unhappy with and otherwise disinterested in initial recommended asset 207. Thus, the content recommendation application may perform an action related to the identifier of media asset 207 in accordance with the detected emotional indicator of user 202. For example, the content recommendation application may reference user profile database 220 in order to obtain media preferences of user 202, and may use such media preferences to recommend one or more new media assets (e.g., from server 302, media content source 304, and/or media guidance data source 306 of FIG. 3) that may be of more interest to the user than media asset 207. In some embodiments, the identifier for media asset 207 that user 202 is determined to be disinterested in may be replaced in GUI 222 by the identifier for updated media asset recommendation 236. Alternatively, the user may be prompted as to whether he or she would like to remove media asset 207 from GUI 222 and/or be eliminated from impacting future recommendations, or the identifier for updated media asset recommendation 236 may be added to GUI 222 without removing the identifier for initial media asset recommendation 207. In some embodiments, emotional indicator database 214 and user profile database 220 may be included in any of server 302, media content source 304, media guidance data source 306 of FIG. 3.

If multiple images of user 202 are captured during a user session, the content recommendation application may compare each set of facial characteristics associated with respective captured images to determine respective emotional indicators for each image. Such respective emotional indicators may be used to determine an aggregate emotional indicator of the user during the user session, such as by utilizing one or more of a variety of techniques (e.g., an average emotional indicator of the detected emotional indicators over the time period, the most common emotional indicator detected over the time period, the most recent emotional indicator detected during the time period, the emotional indicator having the highest confidence score over the time period, or any combination thereof).

In some embodiments, the content recommendation application may wait a predetermined period of time (e.g., 10 seconds) prior to updating a media asset recommendation based on a detected emotional state of the user. For example, the content recommendation application may update recommended content upon determining that the emotional indicators over such predetermined period of time indicate the user is consistently not interested in recommended content while scrolling through recommendations.

In some embodiments, a plurality of identifiers for respective initial recommended media assets may be presented to the user, and the emotional indicator of the user may be detected while the user is scrolling through the plurality of initial recommended media assets. Prior to performing an action related to the identifiers, the content recommendation application may wait until a predefined time has elapsed (e.g., 10 seconds). If GUI 210 or 222 includes a plurality of identifiers for media assets, the content recommendation application may determine a media asset of interest based on which identifier is highlighted by the user via a cursor or selector. If the content recommendation application determines user 202 is not interested in the highlighted media asset (e.g., if the user had highlighted the media asset to see more details or a description of the media asset listing), such media asset identifier may be replaced with an identifier for an updated media asset.

Figure 2B:
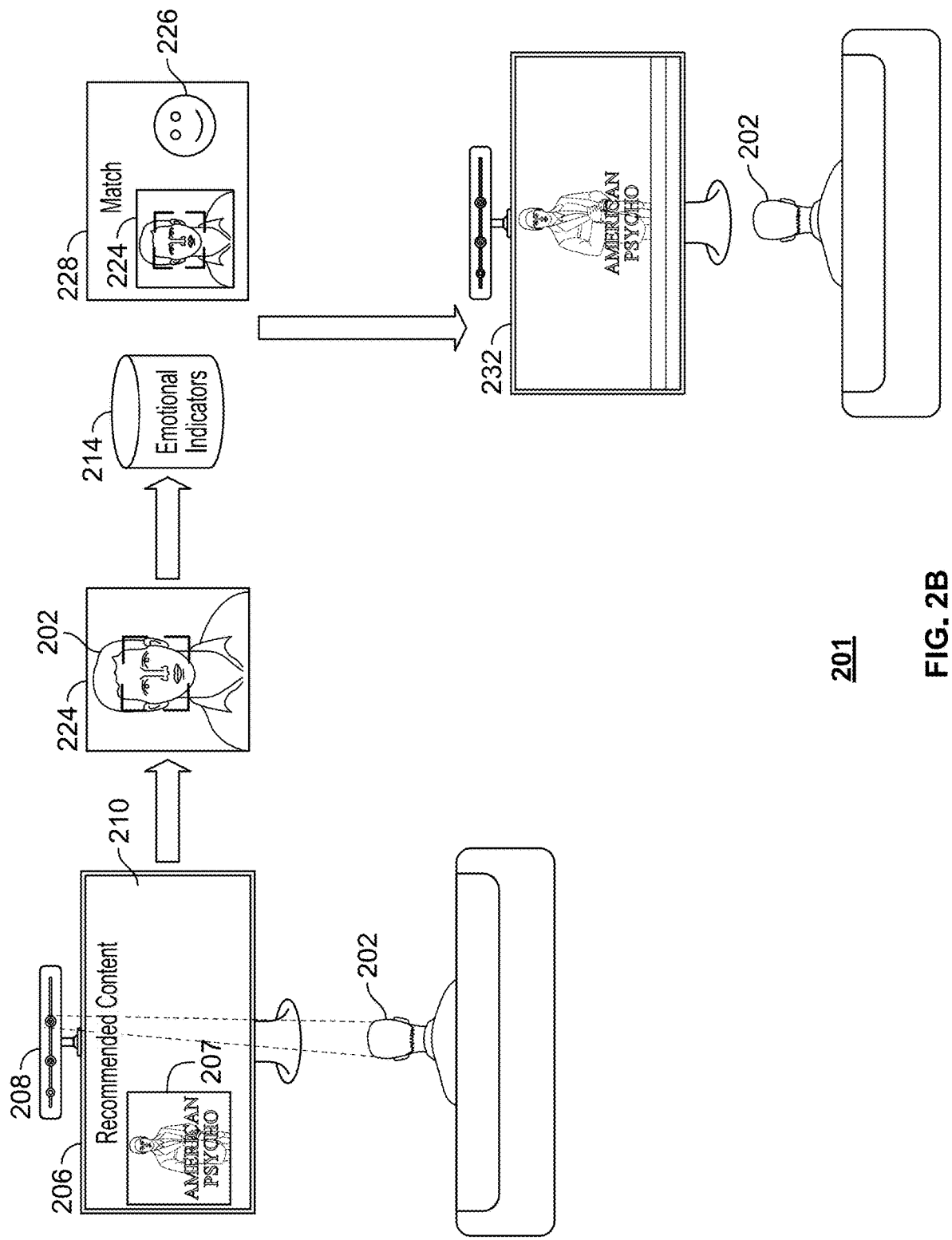
FIG. 2B shows an example of performing, based on a detected emotional indicator, an action related to an identifier for a recommended media asset, in accordance with some embodiments of this disclosure.

FIG. 2B shows an example of system 201 performing, based on a detected emotional indicator, an action related to an identifier for a recommended media asset, in accordance with some embodiments of this disclosure. The example of FIG. 2B is similar to the example of FIG. 2A, except the content recommendation application, after analyzing one or more images 224 of user 202, may determine that the identified or extracted facial characteristics of user 202 match 228 stored characteristics of a "happy" or interested emotional indicator 226 stored in emotional indicator database 214. In this instance, the content recommendation application determines the user is interested in one or more media assets currently presented, and may perform a suitable action (e.g., the content recommendation application may automatically generate for presentation recommended media asset 207 on GUI 232, prompt user 202 to indicate whether he or she desires to consume media asset 207, provide a countdown until media asset 207 is to be generated for presentation, and/or generate for presentation a preview of recommended media asset 207).

In some embodiments, prior to taking action, the content recommendation application may wait until the user has exhibited emotional indicator 226 for the majority of a time period (e.g., 3 seconds out of 5 seconds) of viewing GUI 210, or the average emotional indicator for the user over a certain time period indicates he or she is interested in the media asset. In some embodiments, the content recommendation application may automatically add, or prompt the user to add, media asset 207 to his or her watch list or favorite list associated with a user profile of user 202, when emotional indicator 226 indicates the user is interested in a media asset. Additionally or alternatively, the content recommendation application may generate for presentation identifiers, at a current time or a later time, recommending other media assets sharing characteristics with media asset 207, and/or update the profile of the user based on media asset 207.

Figure 2C:
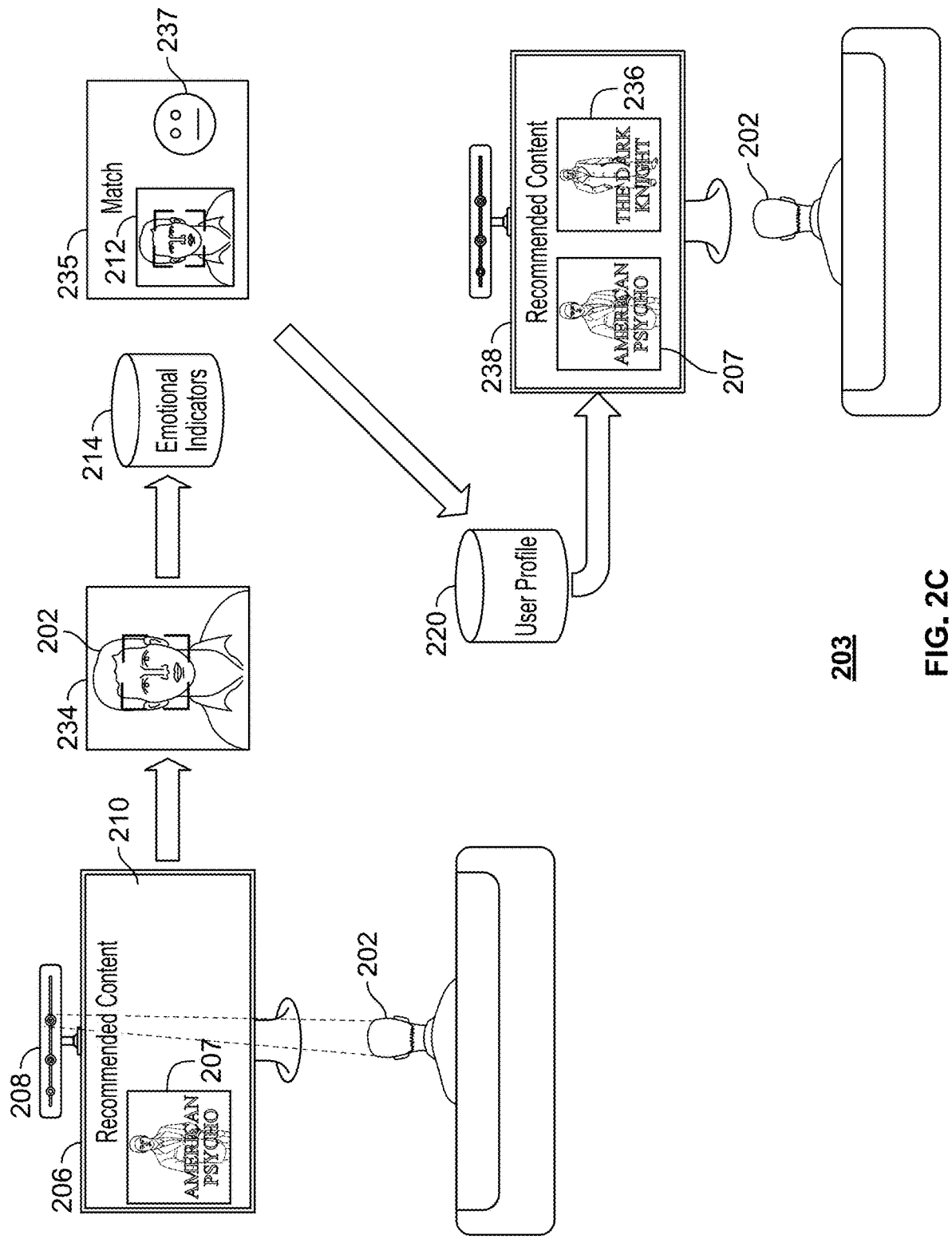
FIG. 2C shows an example of performing, based on a detected emotional indicator, an action related to an identifier for a recommended media asset, in accordance with some embodiments of this disclosure.

FIG. 2C shows an example of system 203 performing, based on a detected emotional indicator, an action related to an identifier for a recommended media asset, in accordance with some embodiments of this disclosure. The example of FIG. 2C is similar to the examples of FIGS. 2A and 2B, except the content recommendation application, after analyzing one or more images 234 of user 202, may determine that the identified or extracted facial characteristics of user 202 match 235 stored characteristics of a "neutral" emotional indicator 237 stored in emotional indicator database 214. In this instance, it may be inconclusive whether user 202 is interested or not in media asset 207, and the content recommendation application may perform one or more of various actions, e.g., refrain from performing an action until a more conclusive emotional indicator is detected from the user, add an identifier for another recommended media asset 236 to GUI, show a preview or more information related to media asset 207, etc.

Figure 2D:
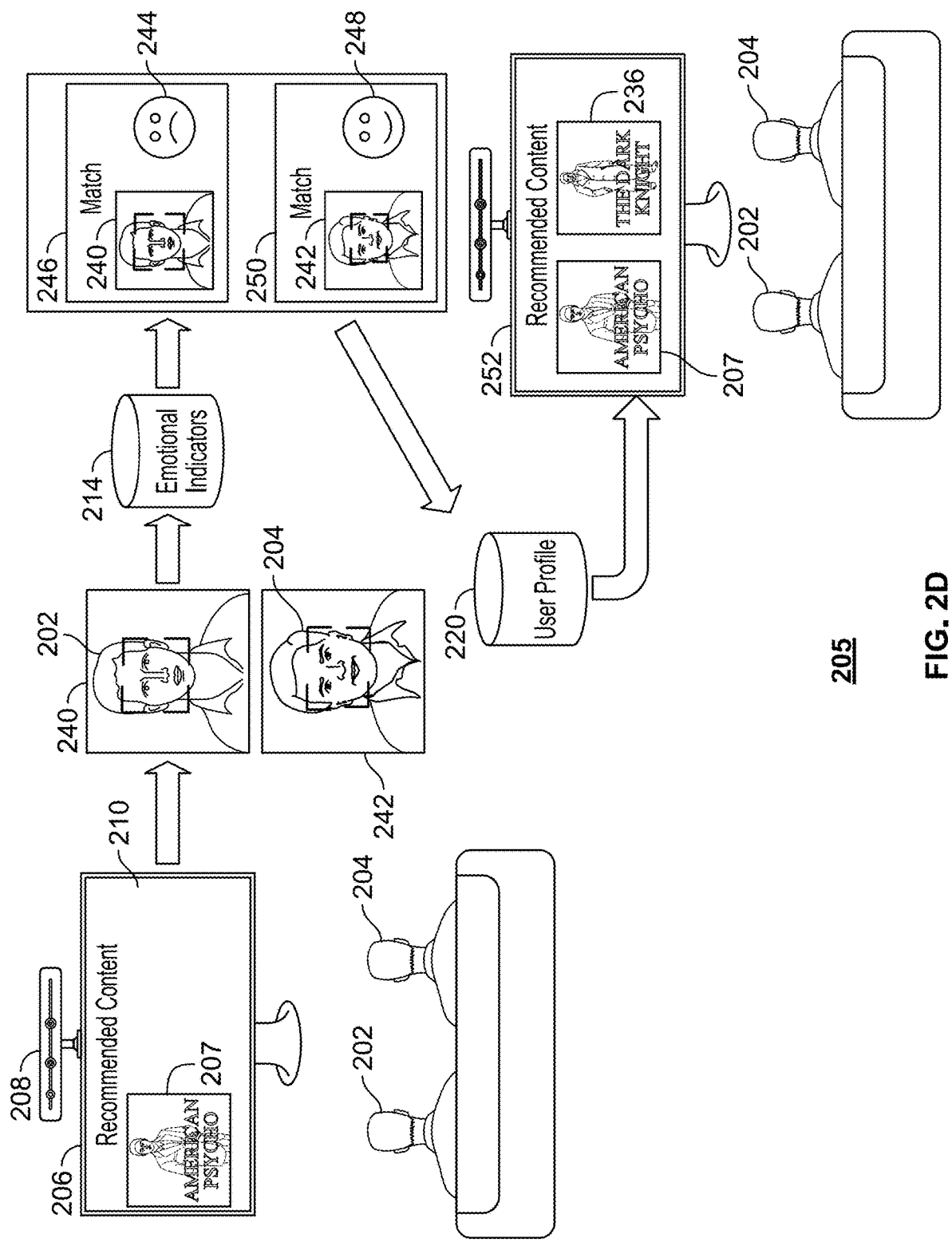
FIG. 2D shows an example of performing, based on a detected emotional indicator, an action related to an identifier for a recommended media asset, in accordance with some embodiments of this disclosure.

FIG. 2D shows an example of system 203 performing, based on a detected emotional indicator, an action related to an identifier for a recommended media asset, in accordance with some embodiments of this disclosure. In this example, GUI 210 generated for presentation by the content recommendation application may be viewed by multiple users 202 and 204. The content recommendation application may use techniques similar to those discussed in FIGS. 2A-2C to detect respective emotional indicators associated with each of user 202 and user 204 while GUI 210, including initial recommended media asset 207, is being generated for display. As shown in FIG. 2D, the content recommendation application may determine that image 240 of facial characteristics of user 202 matches 246 a "sad" or negative emotional indicator 244, and that image 242 of facial characteristics of user 204 matches 250 a "happy", interested or positive emotional indicator 248 stored in emotional indicator database 214.

Since the emotional indicators of user 202 and 204 conflict (e.g., user 204 is interested whereas user 202 is not interested), the content recommendation application may perform an action to address the conflict. For example, the content recommendation application may generate for display an identifier for one or more updated media asset recommendations 236 (e.g., based on a user profile of user 202, user 204, or a combination thereof, and/or the emotional indicator itself), and subsequently monitor emotional indicators related to the new recommended media asset. As another example, the content recommendation application may generate for presentation a preview of the media asset 207, and monitor emotional indicators of users 202 and 204 to determine subsequent action to be taken. In some embodiments, if one or more of the users detected by the content recommendation application does not have a user profile associated with the media service, other techniques may be used to generate for presentation updated recommendations (e.g., based on trending or popular programming, prompting such user to create a profile and enter his or her interests, etc.). Identifiers for recommended media assets, and media assets, may be retrieved from, e.g., server 302, media content source 304, and/or media guidance data source 306 of FIG. 3.

In some embodiments, a selector cursor or highlight icon may be used by the content recommendation application to determine which recommended media asset the user is reacting to. For example, in GUI 252, if a selector cursor or highlight icon (e.g., being controlled by the user via input, or placed on a particular media asset when the user begins accessing the GUI of media asset identifiers) is associated with the identifier for recommended media asset 236, the content recommendation application may determine that any detected emotional indicators of user 202 and 204 correspond to media asset 236. If each of users 202 and 204 have the same or similar reactions to a media asset (e.g., there is no conflict in the emotional indicators of the users), an action consistent with the same or similar emotional indicator may be taken by the content recommendation application.

Although the example of FIG. 2D shows two users 202 and 204 interacting with the content recommendation application, it should be appreciated that emotional indicators of any number of users may be detected by sensor 208 and used in performing an action related to an initial recommended media asset. In some embodiments, an aggregate emotional indicator of multiple users during the user session may be detected. For example, the emotional indicator exhibited by a majority of users in the captured images may determine the action to be performed, or an average emotional indicator for the users in the captured images may determine the action to be performed. Additionally or alternatively, a priority user may be designated (e.g., as the user holding a remote control for user equipment 206, which may be captured in the one or more images, or the primary user associated with the particular account for the media provider), such that the emotional indicator of the priority user takes precedence in determining the aggregate emotional indicator. In some embodiments, an emotional indicator of a newly detected user may be detected (e.g., for at least a predetermined period of time) and may impact the action to be performed. In addition, if the content recommendation application detects that a user has exited the vicinity of user equipment (e.g., for at least a predetermined period of time), the emotional indicator associated with such user may be disregarded in determining an action to be performed related to recommending media assets.

In some embodiments, emotional indicator database 214 may store historical pictures of users (e.g., tagged or associated with a particular emotional indicator). When determining emotional indicators for a particular user, the content recommendation application may perform facial recognition to identify the user, and may compare the image of the identified user to past images of such user stored in emotional indicator database 214. If the content recommendation application determines there is a close match between the image of the user and an image in emotional indicator database 214 (e.g., a similarity above a predefined threshold), the content recommendation application may determine that the current emotional state of the user corresponds to the emotional indicator associated with the image stored in emotional indicator database 214.

Figure 3:
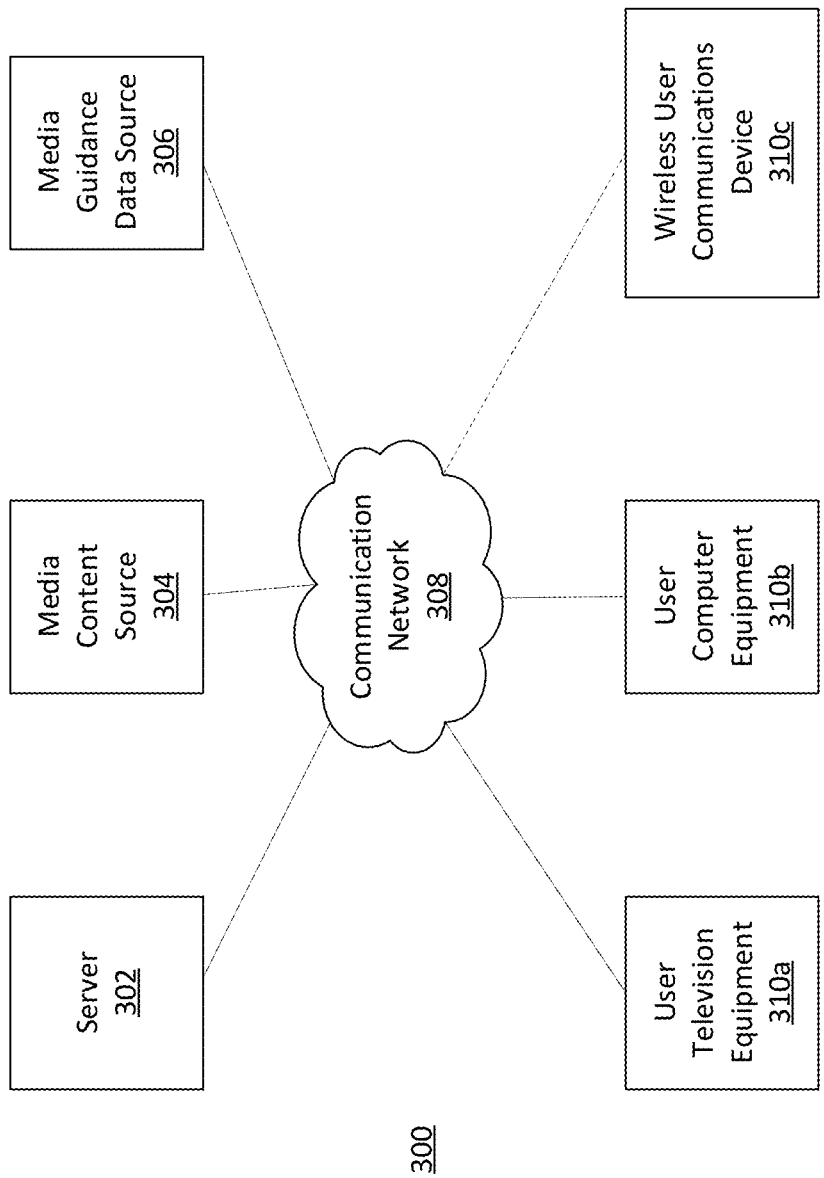
FIG. 3 is a block diagram of an illustrative system in accordance with some embodiments of the disclosure.

FIG. 3 shows an illustrative block diagram of a system 300 for displaying content, in accordance with some embodiments of the disclosure. In various aspects, system 300 includes one or more of server 302, media content source 304, media guidance data source 306, communication network 308, and one or more computing devices or user equipment 310, e.g., user television equipment 310a (e.g., a set-top box), user computer equipment 310b (e.g., a desktop or laptop), and/or wireless user communications device 310c (e.g., a smartphone device or tablet). The computing device or user equipment 310 may correspond to user equipment 106 and 206 in FIGS. 1 and 2A-2D, and may include one or more sensors or devices (e.g., a camera, a microphone, eye scanner, fingerprint scanner, remote control, etc.) to collect biometric data of users. Although FIG. 3 shows one of each component, in various examples, system 300 may include fewer than the illustrated components, multiples of one or more illustrated components, and/or additional components. Communication network 308 may be any type of communication network, e.g., the Internet, a mobile phone network, mobile voice or data network (e.g., a 4G or LTE network), cable network, public switched telephone network, or any combination of two or more of such communication networks. Communication network 308 includes one or more communication paths, such as a satellite path, a fiber-optic path, a cable path, a path that supports Internet communications (e.g., IPTV), free-space connections (e.g., for broadcast or other wireless signals), or any other suitable wired or wireless communication path or combination of such paths. Communication network 308 communicatively couples various components of system 300 to one another. For instance, server 302 may be communicatively coupled to media content source 304, media guidance data source 306, and/or computing device 310 via communication network 308.

In some examples, media content source 304 and media guidance data source 306 may be integrated as one device. Media content source 304 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc.; ABC is a trademark owned by the American Broadcasting Company, Inc.; and HBO is a trademark owned by the Home Box Office, Inc. Media content source 304 may be the originator of content (e.g., a television broadcaster, a Web cast provider, etc.) or may not be the originator of content (e.g., an on-demand content provider, an Internet provider of content of broadcast programs for downloading, etc.). Media content source 304 may include cable sources, satellite providers, on-demand providers, Internet providers, over-the-top content providers, or other providers of content. Media content source 304 may also include a remote media server used to store different types of content (e.g., including video content selected by a user) in a location remote from computing device 310. Systems and methods for remote storage of content and providing remotely stored content to user equipment are discussed in greater detail in connection with Ellis et al., U.S. Pat. No. 7,761,892, issued Jul. 20, 2010, which is hereby incorporated by reference herein in its entirety.

Media content source 304 and media guidance data source 306 may provide content and/or media guidance data to computing device 310 and/or server 302 using any suitable approach. In some embodiments, media guidance data source 306 may provide a stand-alone interactive television program guide that receives program guide data via a data feed (e.g., a continuous feed or trickle feed). In some examples, media guidance data source 306 may provide program schedule data and other guidance data to computing device 310 on a television channel sideband, using an in-band digital signal, an out-of-band digital signal, or any other suitable data transmission technique.

As described in further detail below, server 302 may manage the communication of a live content stream (e.g., a live sporting event broadcast, a live news broadcast, or the like) and recorded streams from media content source 304 to computing device 310 via communication network 308. For instance, in some embodiments, content from media content source 304 and/or guidance data from media guidance data source 306 may be provided to computing device 310 using a client/server approach. In such examples, computing device 310 may pull content and/or media guidance data from server 302 and/or server 302 may push content and/or media guidance data to computing device 310. In some embodiments, a client application residing on computing device 310 may initiate sessions with server 302, media content source 304, and/or media guidance data source 306 to obtain content and/or guidance data when needed, e.g., when the guidance data is out of date or when computing device 310 receives a request from the user to receive content or guidance data. In various aspects, server 302 may also be configured to detect events within the live content stream and, based on the detected events, control the display of content and/or navigation menu options via computing device 310. Additionally, although FIG. 3 shows media content source 304 and media guidance data source 306 as separate from server 302, in some embodiments, media content source 304 and/or media guidance data source 306 may be integrated as one device with server 302.

Content and/or media guidance data delivered to computing device 310 may be over-the-top (OTT) content. OTT content delivery allows Internet-enabled user devices, such as computing device 310, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may transfer only IP packets provided by the OTT content provider. Examples of OTT content providers include FACEBOOK, AMAZON, YOUTUBE, NETFLIX, and HULU, which provide audio and video via IP packets. YouTube is a trademark owned by Google LLC; Netflix is a trademark owned by Netflix, Inc.; Hulu is a trademark owned by Hulu, LLC; Facebook is a trademark owned by Facebook, Inc.; and Amazon is a trademark owned by Amazon.com, Inc. OTT content providers may also include any other OTT content provider. OTT content providers may additionally or alternatively provide media guidance data described above. In addition to content and/or media guidance data, providers of OTT content can distribute applications (e.g., web-based applications or cloud-based applications), or the content can be displayed by applications stored on computing device 310.

Figure 4:
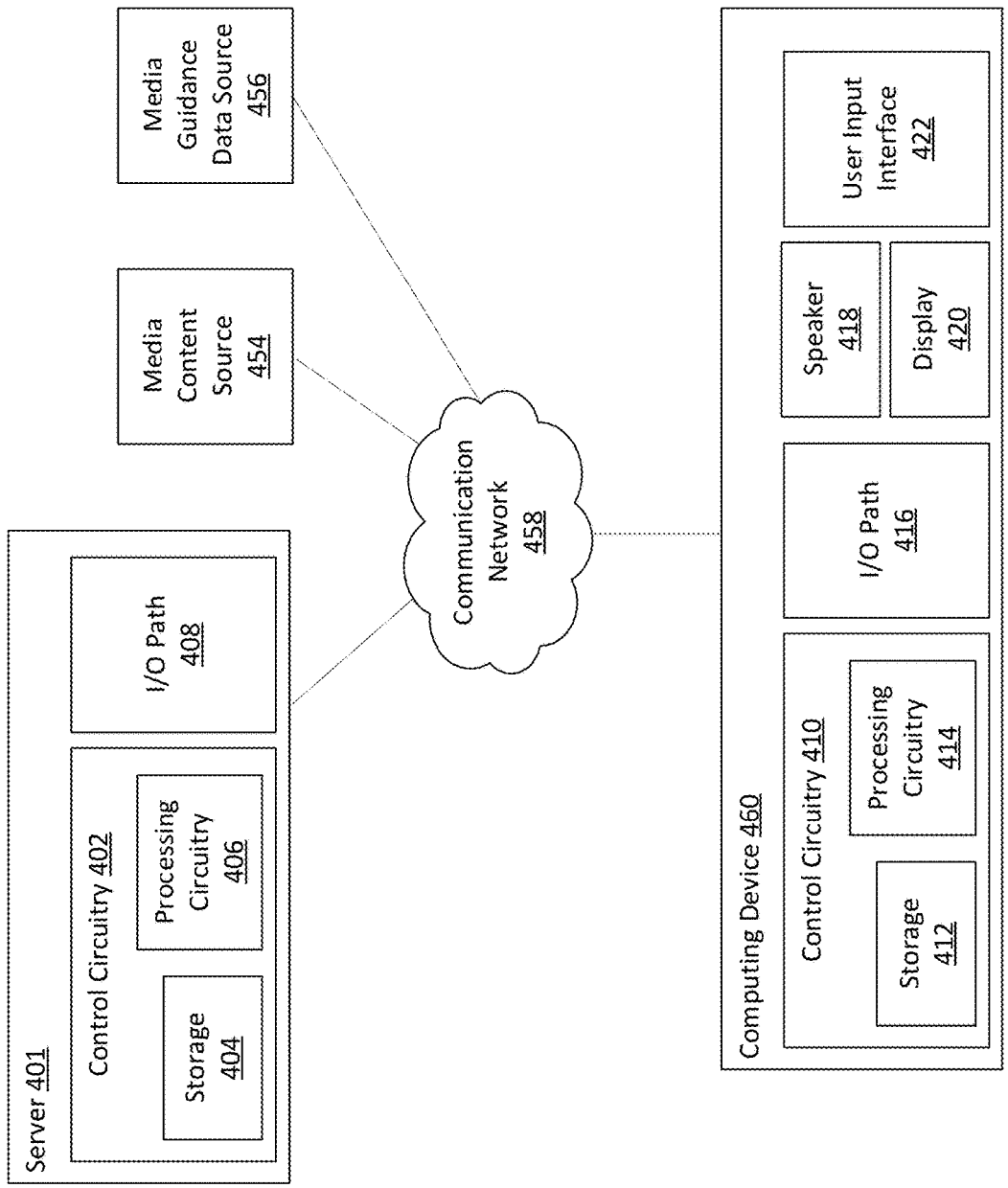
FIG. 4 is another block diagram of an illustrative system in accordance with some embodiments of the disclosure.

FIG. 4 is an illustrative block diagram showing additional details of the system 400 (which may be the same as system 300 of FIG. 3), in accordance with some embodiments of the disclosure. In particular, server 401 (e.g., the same server as server 302) includes control circuitry 402 and I/O path 408, and control circuitry 402 includes storage 404 and processing circuitry 406. Computing device 460 (e.g., one or more of devices 310a, 310, and 310c) includes control circuitry 410, I/O path 416, speaker 418, display 420 (as well circuitry for generating images for display on display 420), and user input interface 422. Control circuitry 410 includes storage 412 and processing circuitry 414. Control circuitry 402 and/or 410 may be based on any suitable processing circuitry such as processing circuitry 406 and/or 414. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors, for example, multiple of the same type of processors (e.g., two Intel Core i9 processors) or multiple different processors (e.g., an Intel Core i7 processor and an Intel Core i9 processor).

Each of storage 404, storage 412, and/or storages of other components of system 300 (e.g., storages of media content source 454, media guidance data source 456, and/or the like) may be an electronic storage device. In some embodiments, media content source 454 may be the same as media content source 304. In some embodiments, media guidance data source 456 may be the same as media content source 306. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called a personal video recorders, or PVRs), solid state devices, quantum storage devices, gaming consoles, gaming media, or any other suitable fixed or removable storage devices, and/or any combination of the same. Each of storage 404, storage 412, and/or storages of other components of system 400 may be used to store various types of content, media guidance data, and or other types of data. Non-volatile memory may also be used (e.g., to launch a boot-up routine and other instructions). Cloud-based storage may be used to supplement storages 404, 412 or instead of storages 404, 412. In some embodiments, control circuitry 402 and/or 410 executes instructions for a content recommendation application stored in memory (e.g., storage 404 and/or 412). Specifically, control circuitry 402 and/or 410 may be instructed by the content recommendation application to perform the functions discussed herein. In some implementations, any action performed by control circuitry 402 and/or 410 may be based on instructions received from the content recommendation application. For example, the content recommendation application may be implemented as software or a set of executable instructions that may be stored in storage 404 and/or 312 and executed by control circuitry 402 and/or 410. In some embodiments, the content recommendation application may be a client/server content recommendation application where only a client content recommendation application resides on computing device 460, and a server content recommendation application resides on server 401.

The content recommendation application may be implemented using any suitable architecture. For example, it may be a stand-alone content recommendation application wholly implemented on computing device 460. In such an approach, instructions for the content recommendation application are stored locally (e.g., in storage 412), and data for use by the content recommendation application is downloaded on a periodic basis (e.g., from an out-of-band feed, from an Internet resource, or using another suitable approach). Control circuitry 410 may retrieve instructions for the content recommendation application from storage 412 and process the instructions to perform the functionality described herein. Based on the processed instructions, control circuitry 410 may determine what action to perform when input is received from user input interface 422.

In client/server-based embodiments, control circuitry 410 may include communication circuitry suitable for communicating with a content recommendation application server (e.g., server 401) or other networks or servers. The instructions for carrying out the functionality described herein may be stored on the application server. Communication circuitry may include a cable modem, an integrated services digital network (ISDN) modem, a digital subscriber line (DSL) modem, a telephone modem, an Ethernet card, a wireless modem for communication with other equipment, or any other suitable communication circuitry. Such communication may involve the Internet or any other suitable communication networks or paths (e.g., communication network 458). In some embodiments, communication network 458 may be the same as network 308. In another example of a client/server-based application, control circuitry 410 runs a web browser that interprets web pages provided by a remote server (e.g., server 401). For example, the remote server may store the instructions for the application in a storage device. The remote server may process the stored instructions using circuitry (e.g., control circuitry 402) and generate the displays discussed above and below. Computing device 460 may receive the displays generated by the remote server and may display the content of the displays locally via display 420. This way, the processing of the instructions is performed remotely (e.g., by server 401) while the resulting displays, such as the display windows described elsewhere herein, are provided locally on computing device 460. For example, computing device 460 may include display circuitry (e.g., video card circuitry or combination motherboard and video card circuitry) configured to generate for display the display windows. Computing device 460 may receive inputs from the user via input interface 422 and transmit those inputs to the remote server for processing and generating the corresponding displays.

A user may send instructions to control circuitry 402 and/or 410 using user input interface 422. User input interface 422 may be any suitable user interface, such as a remote control, trackball, keypad, keyboard, touchscreen, touchpad, stylus input, joystick, voice recognition interface, or other user input interfaces. User input interface 422 may be integrated with or combined with display 420, which may be a monitor, television, liquid crystal display (LCD), electronic ink display, or any other equipment suitable for displaying visual images.

Server 401 and computing device 460 may receive content and data via input/output (hereinafter "I/O") path 408 and 416, respectively. For instance, I/O path 416 may include circuitry that includes one or more of communication port configured to receive a live content stream from server 401 and/or media content source 454 via a communication network 458. Storage 412 may be configured to buffer the received live content stream for playback, and display 420 may be configured to present the buffered content, navigation options, alerts, and/or the like via a primary display window and/or a secondary display window. I/O paths 408, 416 may provide content (e.g., a live stream of content, broadcast programming, on-demand programming, Internet content, content available over a local area network (LAN) or wide area network (WAN), and/or other content) and data to control circuitry 402, 410. Control circuitry 402, 410 may be used to send and receive commands, requests, and other suitable data using I/O paths 408, 416. I/O paths 408, 416 may connect control circuitry 402, 410 (and specifically processing circuitry 406, 414) to one or more communication paths (described below). I/O functions may be provided by one or more of these communication paths but are shown as single paths in FIG. 4 to avoid overcomplicating the drawing.

Figure 5:
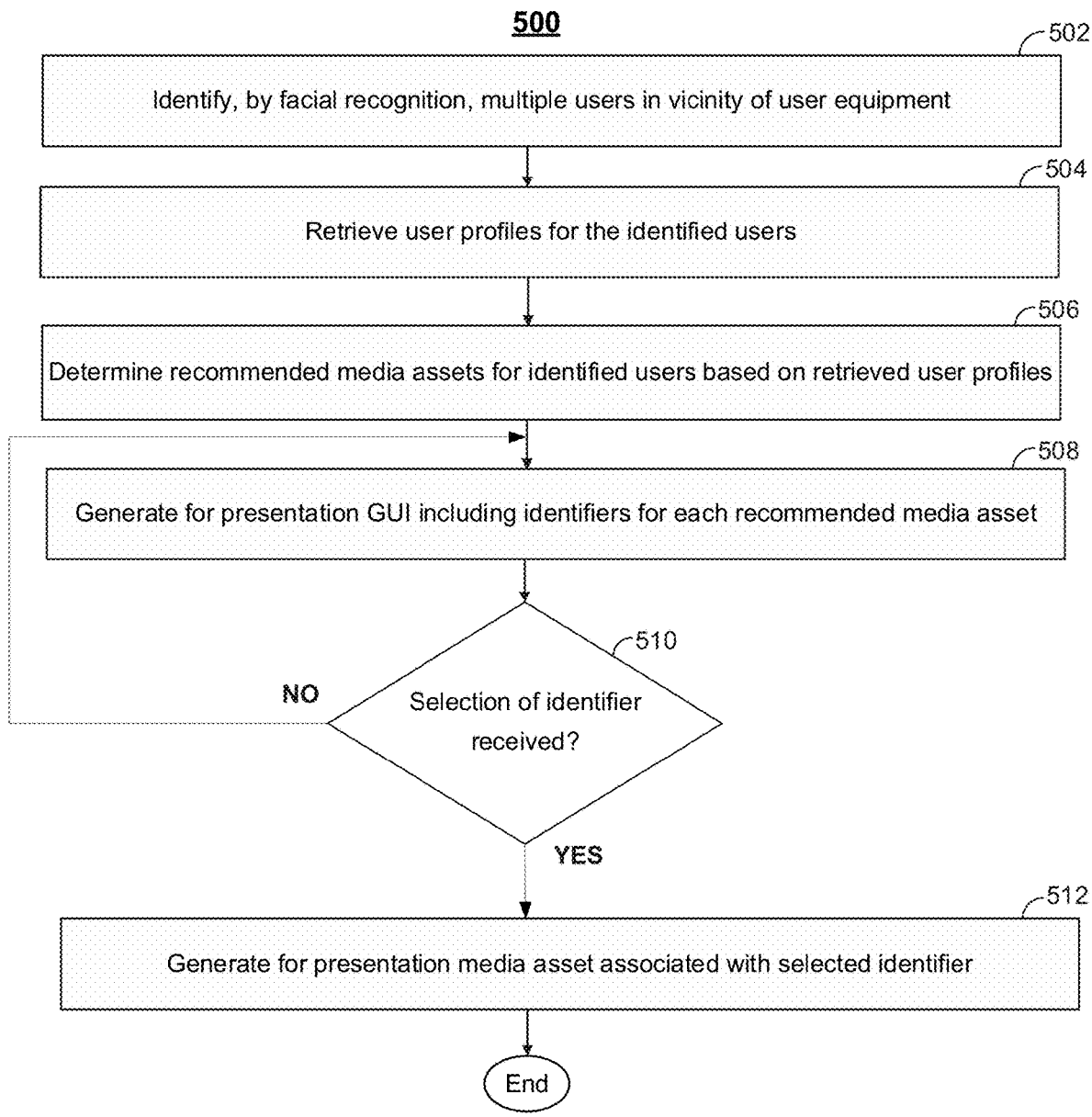
FIG. 5 is a flowchart of a detailed illustrative process for generating identifiers for recommended media assets for multiple users detected to be in a vicinity of user equipment, in accordance with some embodiments of this disclosure.

Having described systems 300 and 400, reference is now made to FIG. 5, which depicts an illustrative flowchart of process 500 for providing media content recommendations that may be implemented by using systems 300 and 400, in accordance with some embodiments of the disclosure. In various embodiments, the individual steps of process 500 may be implemented by one or more components of systems 300 and 400. Although the present disclosure may describe certain steps of process 500 (and of other processes described herein) as being implemented by certain components of systems 300 and 400, this is for purposes of illustration only, and it should be understood that other components of systems 300 and 400 may implement those steps instead. For example, the steps of process 500 may be executed by server 401 and/or by computing device 460 to provide content recommendations.

At 502, control circuitry 410 may identify, by facial recognition, multiple users (e.g., users 102 and 104 of FIG. 1) in a vicinity of user equipment (e.g., user equipment 106 of FIG. 1). Facial recognition may be facilitated by capturing one or more images (e.g., images 102 and 104 of FIG. 1) of each user by way of a sensor (e.g., sensor 108 of FIG. 1, which may be an image sensor), and performing image processing and facial recognition techniques on the captured images to extract and/or identify features of the faces of the users. The extracted facial characteristics may be compared to facial characteristics of users in a database (e.g., biometric database 116 of FIG. 1) to determine whether there is a match. In some embodiments, upon setting up a user profile, the user may be prompted to provide an image of himself or herself, in order to populate the database for subsequent matching.

In some embodiments, artificial intelligence (e.g., machine learning) techniques may be employed by control circuitry 410 and/or control circuitry 402 in matching facial characteristics of users to known users in a database (e.g., biometric database 116 of FIG. 1). For example, a neural network or convolutional neural network machine learning model (e.g., stored in local memory 412 of FIG. 4 and/or remote server 401 of FIG. 4) may be trained to accept as input two sets of facial feature characteristics (e.g., feature vectors), and output a match probability (e.g., by identifying key features or patterns predictive of a match). Training data may include image pairs labeled as matches (e.g., by human reviewers). The match probability may be compared to a threshold value to determine whether there is a match between the two sets of facial characteristics. Neural networks are discussed in greater detail in connection with Brehm, U.S. Patent Application Publication No. US 2020/0183773 A1, published Jun. 11, 2020, which is hereby incorporated by reference herein in its entirety. In some embodiments, other machine learning models may additionally or alternatively be employed (e.g., classifier algorithms, K-nearest neighbors, etc.)

At 504, control circuitry 410 may query a database (e.g., user profile database 118 of FIG. 1) based on the identified users, to obtain user preferences and/or a viewing history associated with user profiles of the identified users (e.g., users 102 and 104 of FIG. 1). In some embodiments, the user profile database and the biometric database may be a single database (e.g., at server 302 of FIG. 3).

At 506, control circuitry 410 and/or control circuitry 402 may determine recommended media assets for the identified users (e.g., users 102, 104 of FIG. 1). In some embodiments, if a particular user does not have a user profile previously registered with a media provider, other factors may be taken into account to create a user profile for the user in order to provide media assets recommendations (e.g., a demographic of the user identified by the facial recognition, popular or trending programming, etc.).

At 508, the control circuitry may generate for presentation a GUI (e.g., GUI 120 of FIG. 1) including identifiers for each recommended media asset (e.g., respective identifiers of media assets 134, 136, 138). In some embodiments, the recommended media assets may be categorized based on an associated user (e.g., category 128 may correspond to user 102 of FIG. 1, category 130 may correspond to user 104 of FIG. 1).

At 510, the control circuitry may receive user selection of one of the identifiers generated for presentation on a GUI (e.g., GUI 120 of FIG. 1). In some embodiments, the GUI may include selectable options (e.g., option 128 associated with user 102, option 130 associated with user 104) the selection of which enables an identifier for a particular media asset recommended to a user (e.g., user 102) to be presented more prominently than that of another identified user (e.g., user 104). In some aspects of this disclosure, the selectable option may be a tab to toggle between identifiers of recommended media assets for the identified users.

If, at 510, user selection of an identifier is received, control circuitry generates for presentation the media asset associated with the selected identifier, at 512. If such a selection has not yet been received, the control circuitry may continue to generate for presentation the identifiers of the media assets, to wait for user selection of one of the identifiers.

In some embodiments, control circuitry 410, communicatively coupled to a sensor (e.g., sensor 108 of FIG. 1), may continuously check whether one of the identified users has exited the vicinity of the user equipment, or whether a new user has entered the vicinity of the user equipment. Control circuitry 410 may, if one of the identified users exits the vicinity of the user equipment, cease generating for presentation recommended content for such user. On the other hand, if control circuitry 410 detects that a new user has entered the vicinity of the user equipment, the process of identifying the user by facial recognition and generating predicted recommendations for such user based on a retrieved user profile may be initiated, and the GUI (e.g., GUI 120 of FIG. 1) may be updated to include a media asset recommendation for the new user (and optionally a category identifier associated with the new user).

Figure 6:
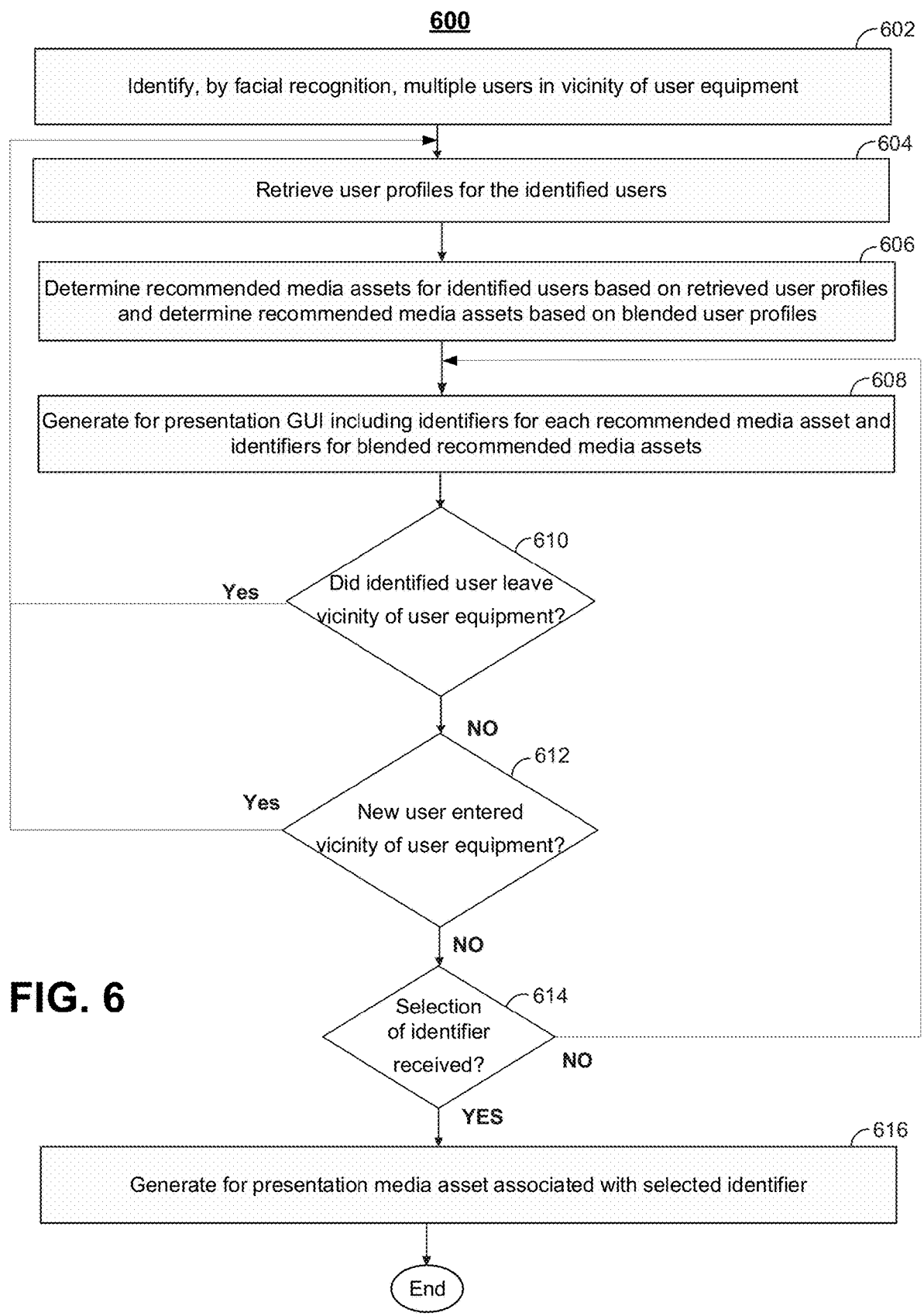
FIG. 6 is a flowchart of a detailed illustrative process for generating identifiers for recommended media assets for multiple users detected to be in a vicinity of user equipment, in accordance with some embodiments of this disclosure.

FIG. 6 depicts an illustrative flowchart of process 600 for providing media content recommendations that may be implemented by using systems 300 and 400, in accordance with some embodiments of the disclosure. In various embodiments, the individual steps of process 600 may be implemented by one or more components of systems 300 and 400. Although the present disclosure may describe certain steps of process 600 (and of other processes described herein) as being implemented by certain components of systems 300 and 400, this is for purposes of illustration only, and it should be understood that other components of systems 300 and 400 may implement those steps instead. For example, the steps of process 600 may be executed by server 401 and/or by computing device 460 to provide content recommendations.

Steps 602 and 604 may be performed in a similar fashion to steps 502 and 504 described above. Step 606 may be performed in a similar fashion to step 506 described above, and may additionally include determining recommended media assets based on the user profiles of the identified users (e.g., users 102 and 104) blended together. For example, control circuitry (e.g., control circuitry 410 and/or control circuitry 402) may identify overlap (e.g., a same media asset or a similar media asset, similar interests as between users. etc.) between the user profiles and/or recommended media assets associated with the users (e.g., users 102 and 104), and determine a media asset most likely to interest each of the users.

Step 608 may be performed in a similar fashion to step 508 described above, and may additionally include generating for presentation a GUI (e.g., GUI 120 of FIG. 1) including one or more identifiers for media assets recommended based on the blended user profiles of the users. The one or more identifiers (e.g., associated with media asset 138 of FIG. 1) may be presented as part of a category (e.g., associated with category identifier 132) associated with the blended user profile recommendation.

At 610, the control circuitry 410 may determine whether one of the identified users left the vicinity of user equipment (e.g., user equipment 106 of FIG. 1). For example, if one of the users is absent from the vicinity of the user equipment for a predetermined period of time (e.g., 2 minutes), the recommended content for such user may be removed from the GUI, and the blended recommendation may be removed (e.g., if the group includes only 2 users before the user exited) or altered (e.g., if the group still includes multiple users after the user exits, in order to prevent the interests of the absent user from impacting the media assets recommended to the group). In some embodiments, a user may be interested in what his or her friends are watching (e.g., if a user's friend is known as a movie buff), and may select an option to receive recommended media assets (and/or blended recommended media assets) based on his or her friend's profile (e.g., even if the friend is not present or is now absent from the vicinity of the user equipment), which may be separately or simultaneously displayed with his or her own recommendations. If no users left the vicinity of the user equipment, processing may continue at step 612.

At 612, the control circuitry may determine that no users have left the vicinity of the user equipment, and may additionally or alternatively determine whether a new user entered a vicinity of the user equipment (e.g., in the time period since identifiers of media assets 134, 136, 138 of FIG. 1 were generated for presentation). In some embodiments, if a new user stays in the vicinity of the user equipment for a threshold period of time (e.g., 15 seconds), the control circuitry may perform facial recognition on the new user, and update the GUI to include a recommended media asset for the new user, as well as update the blended recommendations for the group of users, taking into account user preferences of the user profile of the new user in addition to the preferences of the other identified users in the group. If no users have left the vicinity of the user equipment, processing may continue at step 614.

At 614, control circuitry 410 may determine whether selection of one of the presented identifiers (e.g., an identifier associated with media asset 138 of FIG. 1) is received. If such a selection is received, processing may move to step 616. If such a selection is not received, the control circuitry may wait until such a selection is detected.

At 616, the control circuitry may generate for presentation the media asset (e.g., media asset 138 of FIG. 1) associated with selected identifier. In some embodiments, selection of the blended recommended media asset causes the user profiles of at least a subset of the group of users in the vicinity of the user equipment to be updated.

Figure 7:
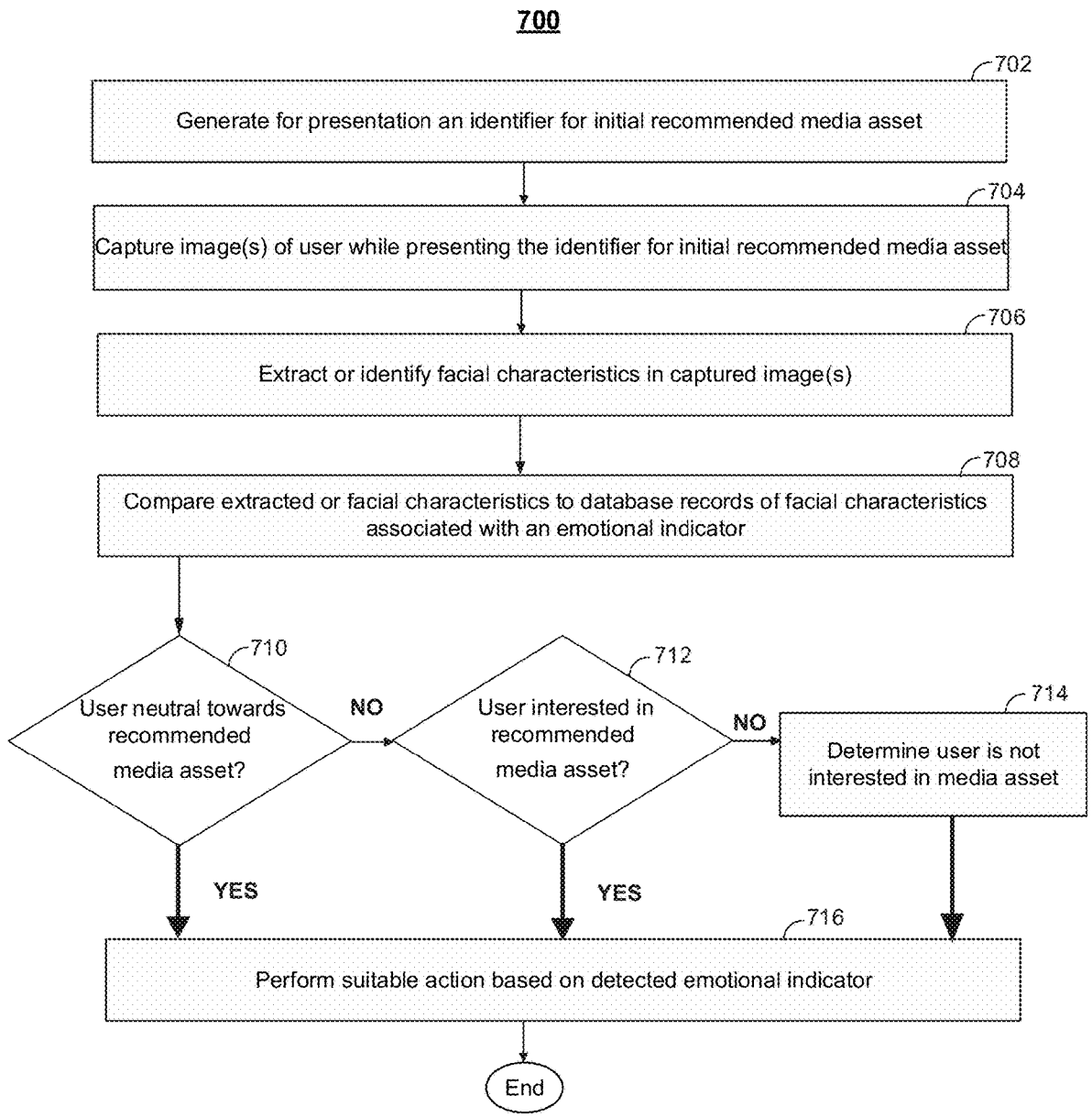
FIG. 7 is a flowchart of a detailed illustrative process for performing, based on a detected emotional indicator, an action related to an identifier for a recommended media asset, in accordance with some embodiments of this disclosure.

FIG. 7 depicts an illustrative flowchart of process 700 for providing media content recommendations that may be implemented by using systems 300 and 400, in accordance with some embodiments of the disclosure. In various embodiments, the individual steps of process 700 may be implemented by one or more components of systems 300 and 400. Although the present disclosure may describe certain steps of process 700 (and of other processes described herein) as being implemented by certain components of systems 300 and 400, this is for purposes of illustration only, and it should be understood that other components of systems 300 and 400 may implement those steps instead. For example, the steps of process 700 may be executed by server 401 and/or by computing device 460 to provide content recommendations.

At 702, control circuitry 410 may generate for presentation to a user (e.g., user 202 of FIGS. 2A-2D) one or more identifiers for respective initial recommended media assets (e.g., media asset 207 of FIG. 2A). The recommended media asset may be provided based on a user profile of a user retrieved from a database (e.g., user profile database 220 of FIG. 2A). In some embodiments, the user and associated user profile may be identified by a media provider based on biometric data (e.g., facial recognition) or other input (e.g., remote control, text, voice, etc.).

At 704, control circuitry 410 may be communicatively coupled with a sensor (e.g., sensor 208 of FIG. 2A), which captures one or more images (e.g., image 212 of FIG. 2A) of the user (e.g., user 202 of FIG. 2A) while the user is viewing the identifier for the initial recommended media asset (e.g., media asset 207).

At 706, control circuitry 410 may perform image processing and/or facial recognition techniques on the one or more captured images (e.g., image 212 of a face of user 202 of FIG. 2A) to extract or identify various features (e.g., facial expressions, body language, position of facial features, etc.).

At 708, control circuitry 410 may compare such identified or extracted facial features to records in a database (e.g., emotional indicator database 214 of FIG. 2A) indicating relationships between facial features and emotional indicators, to determine whether the identified or extracted facial features match a particular emotional indicator. For example, various numerical values may be assigned to identified or extracted facial characteristics in a feature vector, and such feature vector may be compared to feature vectors stored in database records associated with respective emotional indicators (e.g., interested, neutral, not interested). Control circuitry 410 may compute a similarity score based on the comparison, and may determine there is a match if the computed score is above a certain threshold.

In some aspects of this disclosure (e.g., where multiple images of the user are captured), control circuitry 410 may employ a variety of techniques to determine an aggregate emotional indicator of the user during a particular time period of the user session (e.g., when the user views a particular identifier of an initial media asset recommendation). The control circuitry may detect respective emotional indicators that match each of detected facial characteristics, and such emotional indicators may be used to determine an aggregate emotional indicator of the user during the particular time period of the user session, based on a variety of techniques (e.g., an average emotional indicator of the user among the detected emotional indicators over the time period, the most common emotional indicator of the user detected over the time period, the most recent emotional indicator of the user detected during the time period, the emotional indicator of the user having the highest confidence score over the time period, or any combination thereof).

In some embodiments, artificial intelligence (e.g., machine learning) techniques may be employed by control circuitry 402 and/or control circuitry 410 in matching facial characteristics of users to emotional indicators in a database (e.g., emotional indicator database 214 of FIG. 2A). For example, a neural network or convolutional neural network machine learning model (e.g., stored in local memory 412 of FIG. 4 and/or remote server 401 of FIG. 4) may be trained to accept as input two sets of facial feature characteristics (e.g., feature vectors representing the one or more captured images, and feature vectors typical of a user representing a particular emotion), and output a match probability (e.g., by identifying key features or patterns predictive of a match). Training data may include image pairs labeled as matches (e.g., by human reviewers). The match probability may be compared to a threshold value to determine whether there is a match between the two sets of facial characteristics.

At 710, control circuitry 410 may determine whether the extracted or identified facial characteristics match a neutral emotional indicator (e.g., emotional indicator 237 of FIG. 2C, which may be stored in emotional indicator database 214). If the control circuitry determines there is a match (e.g., match 235 of FIG. 2C) with the neutral emotional indicator, processing may move to 716. If the control circuitry determines there is not a match with the neutral emotional indicator, processing may move to 712. A neutral emotional indicator may correspond to facial characteristics that do not exhibit much emotion (e.g., a blank stare), if the user is looking away from the GUI (e.g., checking his or her mobile device), or exhibiting facial characterizes or body language that do not demonstrate one way or another that the user is interested or disinterested in the recommended media asset (e.g., media asset 207 of FIG. 2C).

At 712, control circuitry 410 may determine whether the extracted or identified facial characteristics match an interested emotional indicator (e.g., emotional indicator 226 of FIG. 2B stored in emotional indicator database 214). If the control circuitry determines there is a match with the interested emotional indicator, processing may move to 716. If the control circuitry determines there is not a match with the interested emotional indicator, processing may move to 714. An interested emotional indicator may correspond to facial characteristics suggesting the user is happy (e.g., smiling and/or laughing) or excited, and/or movement (e.g., nodding his or her head) suggesting the user is interested in a particular recommended media asset (e.g., media asset 207 in FIG. 2A).

At 714, control circuitry 410 may determine that the user is not interested in the media asset (e.g., since the comparison in each of 710 and 712 may not have resulted in a match). A "not interested" emotional indicator (e.g., indicator 216 of FIG. 2A) may correspond to facial characteristics suggesting the user is unhappy (e.g., frowning or upset) and/or movement (e.g., shaking his or her head), suggesting the user is not interested in a particular recommended media asset (e.g., media asset 207 in FIG. 2A). In some embodiments, control circuitry 410 may determine a highest similarity score, computed based on comparisons to possible emotional states (e.g., interested, neutral, not interested), and the detected emotional indicator of the user may correspond to the highest similarity score.

At 716, control circuitry 410 may perform a suitable action based on the detected emotional indicator. For example, if control circuitry 410 determines at 710 the user is neutral towards the recommended media asset (e.g., media asset 207 of FIG. 2C), control circuitry 410 may perform one or more actions from among a variety of suitable actions related to a currently presented identifier of the recommended media asset (e.g., wait for the user to demonstrate a more meaningful emotion, generate for display an identifier for an updated media asset, refrain from taking action, etc.). If control circuitry 410 determines at 712 the user is interested in the recommended media asset (e.g., media asset 207 of FIG. 2B), control circuitry 410 may perform one or more actions from among a variety of suitable actions related to the currently presented identifier of the recommended media asset (e.g., cause the recommended media asset to be presented to the user, add the media asset to a user playlist or watch list, remind the user to watch the media asset at a later time, present a preview of the media asset, etc.). If control circuitry 410 determines at 714 the user is not interested in the recommended media asset, control circuitry 410 may perform one or more actions from among a variety of suitable actions related to the currently presented identifier of the recommended media asset (e.g., generate for display an identifier for one or more updated media assets, in addition to or replacing the currently displayed identifier, modify user preferences to avoid a media asset with similar characteristics from being recommended to the user again, etc.).

In some embodiments, the detected emotional indicator, along with the retrieved user profile of the user, may be used in selecting an updated recommended media asset to present to the user. For example, if control circuitry 410 determines the emotional indicator suggests the user is sad or angry about the initial recommended media asset, an updated recommended media asset may be provided to improve the mood of the user (e.g., a comedy may be recommended to the user, and the user profile of the user may also be taken into account in selecting the particular comedy). In some embodiments, prior to presenting identifiers for recommended media assets, control circuitry 410 may determine an initial emotional indicator of the user (e.g., when the user accesses a media provider application or turns on the user equipment), and the initial media asset recommendation may be based on the initial emotional indicator of the user (e.g., if the user is in a happy mood, a recommendation for a comedy may be recommended; if control circuitry detects a user is accompanied by his or her significant other, a recommendation for romantic comedy may be presented; if a mother, father, daughter and son are detected, a recommendation for family-friendly content may be presented).

Figure 8:
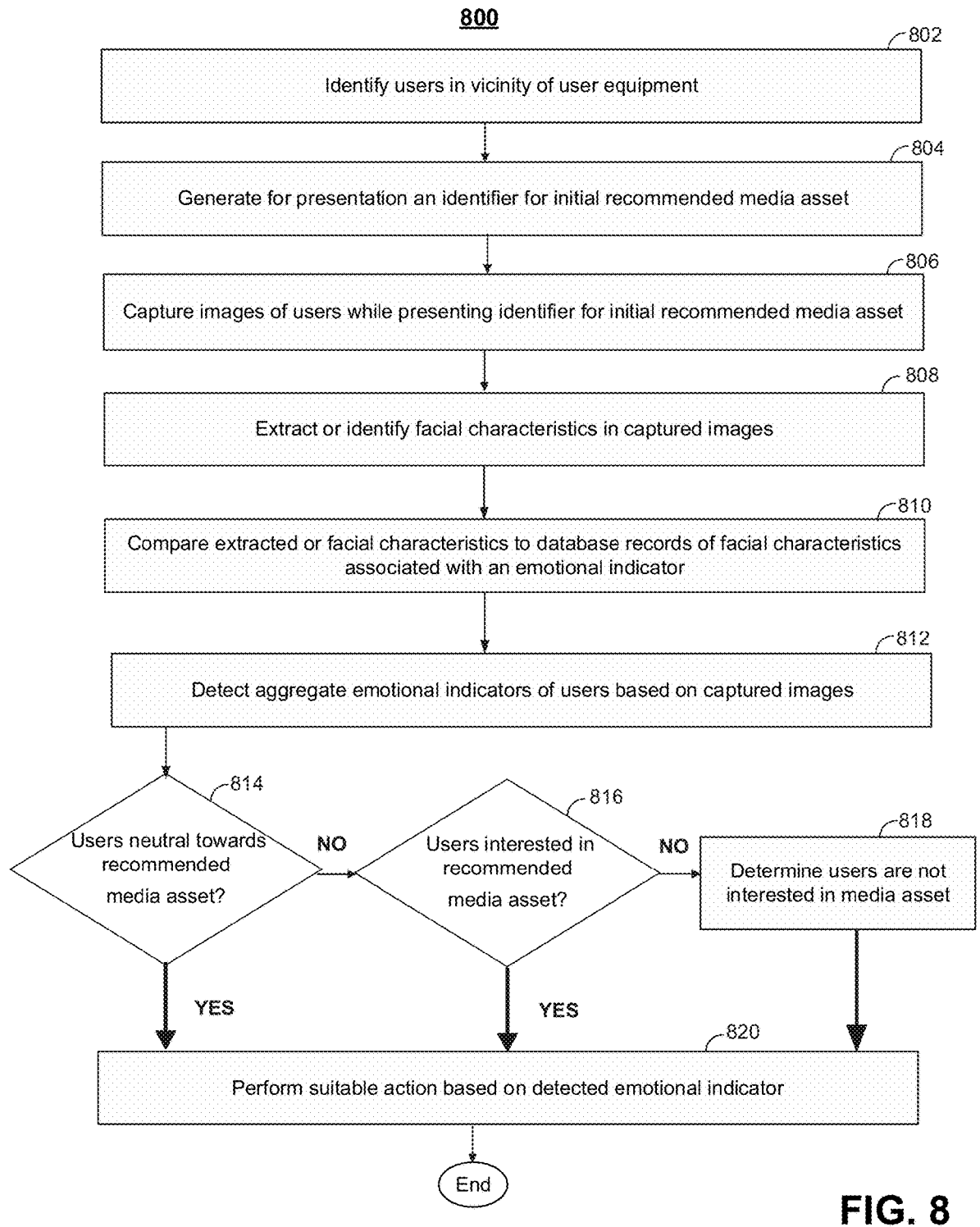
FIG. 8 is a flowchart of a detailed illustrative process for performing, based on a detected emotional indicator, an action related to an identifier for a recommended media asset, in accordance with some embodiments of this disclosure.

FIG. 8 depicts an illustrative flowchart of process 800 for providing media content recommendations that may be implemented by using systems 300 and 400, in accordance with some embodiments of the disclosure. In various embodiments, the individual steps of process 800 may be implemented by one or more components of systems 300 and 400. Although the present disclosure may describe certain steps of process 800 (and of other processes described herein) as being implemented by certain components of systems 300 and 400, this is for purposes of illustration only, and it should be understood that other components of systems 300 and 400 may implement those steps instead. For example, the steps of process 800 may be executed by server 401 and/or by computing device 460 to provide content recommendations.

At 802, control circuitry 410 may identify, by facial recognition, multiple users (e.g., users 202 and 204 of FIG. 2D) in a vicinity of user equipment (e.g., user equipment 206 of FIG. 2D). In some embodiments, at least one of such users may be identified by facial recognition. Facial recognition may be facilitated by capturing one or more images (e.g., images 240 and 242 of FIG. 2D) of each user by way of a sensor (e.g., sensor 208 of FIG. 2D, which may be a camera), and performing image processing and facial recognition techniques on the captured images to extract and/or identify features of a face of the users. The extracted facial characteristics may be compared to facial characteristics of users in a database (e.g., biometric database 116 of FIG. 1) to determine whether there is a match. In some embodiments, upon setting up a user profile, the user may be prompted to provide an image of himself or herself, in order to populate the database for subsequent matching, and control circuitry 410 may use such images to perform facial recognition of users.

Step 804 may be similar to step 702 described above in connection with FIG. 7, and may additionally include retrieving user profiles for each of the identified users, and presenting recommended content (e.g., initial recommended media asset 207) based on aggregate preferences of the users (e.g., a media asset having characteristics each of the users is likely to be interested in).

Step 806 may be similar to step 704 described above in connection with FIG. 7, and may additionally include capturing images of each of the multiple users (e.g., users 202 and 204 of FIG. 2D) while presenting the identifier for the initial recommended media asset. Step 808 may be similar to step 706 described above in connection with FIG. 7, and may additionally include extracting or identifying facial characteristics of each of the multiple users from the captured images (e.g., images 240 and 242 of FIG. 2D). Step 810 may be similar to step 708 described above in connection with FIG. 7, where the comparison to database records may additionally be performed for each user and respective images associated with each user.

At 812, an aggregate emotional indicator of the multiple users during the user session may be detected. For example, the emotional indicator exhibited by a majority of users in the captured images may determine the aggregate emotional indicator of the group, or an average emotional indicator for the users in the captured images may determine the aggregate emotional indicator of the group. Additionally or alternatively, a priority user may be designated (e.g., the user holding a remote control for user equipment 206, or the primary user associated with the particular account for the media provider), such that the emotional indicator of the priority user takes precedence in determining the aggregate emotional indicator.

Steps 814-820 of FIG. 8 may be performed in a similar manner to steps 710-716, respectively, of FIG. 7. In some embodiments, preferences of each of the detected users may be taken into consideration (e.g., in a case that performing the action related to the identifier for the initial media asset recommendation corresponds to generating for presentation an identifier for an updated media asset recommendation). Once a media asset is selected, user profiles of at least a subset of the users may be updated based on the selected media asset. In some embodiments, if a user of the plurality of users exits the vicinity of user equipment (e.g., user equipment 206), for at least a predetermined period of time (e.g., 10 seconds) the emotional indicator and user profile associated with that user may be disregarded in determining an action to be performed (e.g., the aggregate emotional indicator may be updated for the remaining group members). In some embodiments, if the content recommendation application determines a new user has entered the vicinity of the user equipment, the identify of such user may be detected (e.g., by sensor 208) and used in determining a new aggregate emotional indicator and the action to be performed related to the identifier of the currently presented media asset (e.g., media asset 207 of FIG. 2D).

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   causing, by control circuitry, a device to display to a group of users, a first identifier for an initial recommended media asset;
   capturing, using a sensor, images of the group of users while causing the device to display the first identifier for the initial recommended media asset to the group of users;
   determining, based at least in part on the control circuitry analyzing the captured images of the group of users, that an aggregate emotional indicator of the group of users toward the initial recommended media asset corresponds to a neutral emotional indicator;
   determining, based at least in part on the aggregate emotional indicator of the group of users toward the initial recommended media asset being the neutral emotional indicator, that it is inconclusive whether the group of users is interested in the initial recommended media asset, wherein the initial recommended media asset is not being played while capturing the images or while determining the aggregate emotional indicator of the group of users; and
   based at least in part on determining that the aggregate emotional indicator of the group of users toward the initial recommended media asset is the neutral emotional indicator and that it is inconclusive whether the group of users is interested in the initial recommended media asset:
      automatically causing, by the control circuitry at a second time later than the first time, simultaneous display, at the device to the group of users, a second identifier for a second recommended media with the first identifier for the initial recommended media asset.

2. The method of claim 1, wherein determining, based at least in part on the control circuitry analyzing the captured images of the group of users, the aggregate emotional indicator of the group of users comprises:
   extracting, from the captured images of the group of users, facial characteristics corresponding to each user of the group of users;
   comparing the extracted facial characteristics corresponding to each user to a database containing records of facial characteristics associated with emotional indicators;
   determining emotional indicators associated with each user as corresponding to the emotional indicators associated with the captured images of the group of users; and
   aggregating the emotional indicators associated with each user of the group of users by using an appropriate aggregating technique.

3. The method of claim 2, wherein the appropriate aggregating technique is one of: an average emotional indicator of the determined emotional indicators over a time period, a most common emotional indicator detected over the time period, a most recent emotional indicator detected during the time period, an emotional indicator having a highest confidence score over the time period, or any combination thereof.

4. The method of claim 1, further comprising:
   designating a user holding a remote control for user equipment as a priority user, wherein an emotional indicator associated with the priority user takes precedence in determining the aggregate emotional indicator of the group of users.

5. The method of claim 1, further comprising:
   updating a plurality of user profiles associated with a plurality of users, respectively, of the group of users based at least in part on receiving selection of the first identifier for the initial recommended media asset or the second identifier for the second media asset.

6. The method of claim 5, wherein each user profile of the plurality of user profiles associated with the plurality of users, respectively, of the group of users includes a viewing history of the respective user.

7. The method of claim 1, further comprising:
   detecting a presence of a new user in a vicinity of user equipment for at least a predetermined period of time; and
   aggregating a determined emotional indicator associated with the new user with the emotional indicators associated with the group of users.

8. The method of claim 1, further comprising:
   detecting that a user has exited a vicinity of user equipment for at least a predetermined period of time; and
   disregarding an emotional indicator associated with the user while determining the aggregate emotional indicator of the group of users.

9. The method of claim 1, wherein determining, based at least in part on the control circuitry analyzing the captured images of the group of users, that the aggregate emotional indicator of the group of users toward the initial recommended media asset corresponds to the neutral emotional indicator further comprising:
   generating a plurality of vectors corresponding to facial features of the group of user;

comparing the plurality of vectors to one or more vectors corresponding to a neutral emotional indicator; and determining, based at least in part on the comparing, that a similarity between the plurality of vectors and the one or more vectors exceeds a threshold.

10. The method of claim 1, further comprising:

based at least in part on determining that the aggregate emotional indicator of the group of users toward the initial recommended media asset is the neutral emotional indicator and that it is inconclusive whether the group of users is interested in the initial recommended media asset, causing presentation of additional information related to the initial recommended media asset.

11. The method of claim 10, wherein the additional information comprises a preview of the initial recommended media asset.

12. The method of claim 1, wherein the neutral emotional indicator is determined based at least in part on determining that one or more of users of the group of users is looking away from the device at which the initial recommended media asset is being displayed.

13. A system comprising:

a memory configured to a store a user profile; and a control circuitry configured to:

cause a device to display, to a group of users, a first identifier for an initial recommended media asset;

capture, using a sensor, images of the group of users while cause display of the first identifier for the initial recommended media asset to the group of users;

determine, based at least in part on the control circuitry analyzing the captured images of the group of users, that an aggregate emotional indicator of the group of users toward the initial recommended media asset corresponds to a neutral emotional indicator;

determine, based at least in part on the aggregate emotional indicator of the group of users, toward the initial recommended media asset being the neutral emotional indicator, that it is inconclusive whether the group of users is interested in the initial recommended media asset, wherein the initial recommended media asset is not being played while capturing the images or while determining the aggregate emotional indicator of the group of users; and based at least in part on determining that the aggregate emotional indicator of the group of users toward the initial recommended media asset is the neutral emotional indicator and that it is inconclusive whether the group of users is interested in the initial recommended media asset:

automatically cause, at a second time later than the first time, simultaneous display, at the device to the group of users, a second identifier for a second recommended media asset with the with the first identifier for the initial recommended media asset.

14. The system of claim 13, wherein the control circuitry is configured to determine, based at least in part on the analyzing of the captured images of the group of users, the aggregate emotional indicator of the group of users by:

extracting, from the captured images of the group of users, facial characteristics corresponding to each user of the group of users;

comparing the extracted facial characteristics corresponding to each user to a database containing records of facial characteristics associated with emotional indicators;

determining emotional indicators associated with each user as corresponding to the emotional indicators associated with the captured images of the group of users; and aggregating the emotional indicators associated with each user of the group of users by using an appropriate aggregating technique.

15. The system of claim 14, wherein the appropriate aggregating technique is one of: an average emotional indicator of the determined emotional indicators over a time period, a most common emotional indicator detected over the time period, a most recent emotional indicator detected during the time period, an emotional indicator having a highest confidence score over the time period, or any combination thereof.

16. The system of claim 13, wherein the control circuitry is further configured to:

designate a user holding a remote control for user equipment as a priority user, wherein an emotional indicator associated with the priority user takes precedence in determining the aggregate emotional indicator of the group of users.

17. The system of claim 13, wherein the control circuitry is further configured to:

update a plurality of user profiles associated with a plurality of users, respectively, of the group of users based at least in part on receiving selection of the first identifier for the initial recommended media asset or the second identifier for the second media asset.

18. The system of claim 17, wherein each user profile of the plurality of user profiles associated with the plurality of users, respectively, of the group of users includes a viewing history of the respective user.

19. The system of claim 13, wherein the control circuitry is further configured to:

detect a presence of a new user in a vicinity of user equipment for at least a predetermined period of time; and aggregate a determined emotional indicator associated with the new user with the emotional indicators associated with the group of users.

20. The system of claim 13, wherein the control circuitry is further configured to:

detect that a user has exited a vicinity of user equipment for at least a predetermined period of time; and disregard an emotional indicator associated with the user while determining the aggregate emotional indicator of the group of users.

* * * * *